(12) United States Patent
Tian et al.

(10) Patent No.: US 12,045,247 B2
(45) Date of Patent: Jul. 23, 2024

(54) DATA SYNCHRONIZATION METHOD AND DEVICE

(71) Applicant: Huawei Technologies Co., Ltd., Shenzhen (CN)

(72) Inventors: Wengang Tian, Shenzhen (CN); Zhongxing He, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 210 days.

(21) Appl. No.: 17/727,250

(22) Filed: Apr. 22, 2022

(65) Prior Publication Data

US 2022/0245143 A1    Aug. 4, 2022

Related U.S. Application Data

(63) Continuation of application No. PCT/CN2020/113117, filed on Sep. 3, 2020.

(30) Foreign Application Priority Data

Oct. 24, 2019  (CN) .......................... 201911034072.7

(51) Int. Cl.
  *G06F 16/2458*  (2019.01)
  *G06F 16/21*    (2019.01)
  *G06F 16/27*    (2019.01)

(52) U.S. Cl.
  CPC ........ *G06F 16/2474* (2019.01); *G06F 16/219* (2019.01); *G06F 16/27* (2019.01)

(58) Field of Classification Search
  CPC .... G06F 16/2474; G06F 16/219; G06F 16/27; H04L 67/1095; H04L 67/10; H04L 67/01
  See application file for complete search history.

(56) References Cited

U.S. PATENT DOCUMENTS

| | | | |
|---|---|---|---|
| 2009/0193149 | A1 | 7/2009 | Khosravy |
| 2015/0207899 | A1 | 7/2015 | Yoshikawa et al. |
| 2017/0195417 | A1 | 7/2017 | Brand |
| 2019/0222643 | A1 | 7/2019 | Karani et al. |
| 2021/0034589 | A1* | 2/2021 | Mathur ............... G06F 11/1435 |
| 2022/0078829 | A1* | 3/2022 | Bergheim ............. G06Q 10/02 |
| 2022/0245143 | A1 | 8/2022 | Tian et al. |

FOREIGN PATENT DOCUMENTS

| | | |
|---|---|---|
| CN | 1852137 A | 10/2006 |
| CN | 101064630 A | 10/2007 |
| CN | 102143194 A | 8/2011 |
| CN | 102469144 A | 5/2012 |
| CN | 102664871 A | 9/2012 |

(Continued)

*Primary Examiner* — Albert M Phillips, III
(74) *Attorney, Agent, or Firm* — Conley Rose, P.C.

(57) ABSTRACT

A data synchronization method applied to data synchronization between heterogeneous databases includes a terminal device that records a primary key, attribute information, a version number, and a synchronization status of a data object using a first storage format, and a cloud device that records a primary key, attribute information, and a version number of a data object using a second storage format such that the terminal device and the cloud device implement data synchronization between the heterogeneous databases based on the storage formats and version numbers.

20 Claims, 10 Drawing Sheets

Terminal device    Network    Cloud device

(56) References Cited

FOREIGN PATENT DOCUMENTS

| CN | 102761567 | A |   | 10/2012 | |
|----|-----------|---|---|---------|---|
| CN | 103064976 | A |   | 4/2013  | |
| CN | 103841167 | A |   | 6/2014  | |
| CN | 103873519 | A |   | 6/2014  | |
| CN | 104065752 | A |   | 9/2014  | |
| CN | 106973090 | A |   | 7/2017  | |
| CN | 108259562 | A |   | 7/2018  | |
| CN | 108536752 | A |   | 9/2018  | |
| CN | 110324385 | A | * | 10/2019 | |
| CN | 110442564 | A | * | 11/2019 | ........... G06F 16/214 |
| CN | 110769061 | A |   | 2/2020  | |
| EP | 3113447   | A1|   | 1/2017  | |

* cited by examiner

DATA SYNCHRONIZATION METHOD AND DEVICE

CROSS-REFERENCE TO RELATED APPLICATIONS

This is a continuation of International Patent Application No. PCT/CN2020/113117 filed on Sep. 3, 2020, which claims priority to Chinese Patent Application No. 201911034072.7 filed on Oct. 24, 2019. The disclosures of the aforementioned applications are hereby incorporated by reference in their entireties.

TECHNICAL FIELD

This disclosure relates to the field of data synchronization technologies, and in particular, to a data synchronization method and a device.

BACKGROUND

With popularization of various terminal devices, a user may have a plurality of terminal devices, for example, a plurality of mobile phones. Generally, a contact is added to a mobile phone. Contact information is automatically synchronized to another device. In this way, the same information does not need to be input to each mobile phone, to provide convenience for the user. If the user does not have a plurality of terminal devices, some data at a terminal side needs to be backed up to a cloud side, to ensure data reliability. For example, the contact information cannot be recovered if the mobile phone is lost and the contact information is not backed up and stored. The mobile phone is constantly upgraded. Some users may change the mobile phones every two or three years. When the users change the mobile phones, information in an original mobile phone generally needs to be transferred to a new mobile phone.

These scenarios may be all implemented through synchronization between the cloud side and the terminal side. Data of the user in one terminal device may be synchronized to another terminal device by using the cloud side. Alternatively, data on the terminal side may be directly backed up to the cloud side. In this case, the data is restored to the terminal device from the cloud side when necessary. Because a terminal-side environment (for example, a constraint in power consumption, security, and space) is different from a cloud-side environment (for example, sufficient resources and comprehensive security protection methods), data management on the terminal side and data management on the cloud side are generally heterogeneous. The data management on the terminal side generally uses an embedded database such as SQLITE. The data management on the cloud side generally uses a distributed database or middleware such as MYSQL and middleware. In this case, data synchronization between the terminal side and the cloud side is synchronization between heterogeneous databases.

Data consistency between the heterogeneous databases needs to be maintained during the synchronization between the heterogeneous databases. This problem urgently needs to be resolved.

SUMMARY

Embodiments of this disclosure provide a data synchronization method, to ensure data consistency in synchronization between heterogeneous databases. Embodiments of this disclosure further provide a corresponding device.

To achieve the foregoing objective, the following technical solutions are used in embodiments of this disclosure.

A first aspect of this disclosure provides a data synchronization method, applied to a data synchronization process between heterogeneous databases. The heterogeneous databases may indicate that databases of a terminal device and a cloud device have different structures. For example, the terminal device generally uses an embedded database, and the cloud device generally uses a distributed database. The method is applied to the terminal device. The method may include that the terminal device modifies a first storage format of a first data object in the terminal device in response to an operation of an application for the first data object. The first storage format includes a primary key field used to store a primary key for uniquely identifying the first data object, a first field used to store an attribute for describing the first data object, a version number field used to store a version number of the first data object, and a synchronization status field. The terminal device sends a synchronization message to the cloud device. The synchronization message includes the primary key of the first data object. The terminal device receives a synchronization response message that is sent by the cloud device after the cloud device modifies a second storage format of the first data object in the cloud device based on the synchronization message. The synchronization response message includes the primary key. The terminal device performs a modification operation on the first storage format of the first data object in the terminal device in response to the synchronization response message.

In the technical solutions provided in the first aspect, the user may perform operations such as insertion, update, deletion, and query on the first data object by using an application. The application may be, for example, an address book, a gallery, or an instant application. The address book is used as an example. The first data object may be a contact record. The first storage format indicates a storage format of the first data object in the terminal device. The primary key is generally used to uniquely identify a data object. Therefore, the primary key can be used to search for the data object. The attribute of the first field may be information such as a name, a mobile phone number, a fixed-line phone number, an e-mail address, and an address. The synchronization status field is used to indicate whether information of the first field is synchronized, whether synchronization is required, and whether synchronization is being performed. The first storage format may further include an indication field for indicating which information in a first storage field is modified, and certainly may further include a deletion indication field. Indication information in the deletion indication field is used to indicate a deletion operation or a non-deletion operation. The storage format corresponds to a version of the application. For example, when the application version is 1.1.0, the first storage format of the address book may include information of three fields: a name, a mobile phone number, and a fixed-line phone number. When the application version is 1.2.0, the first storage format of the address book may include information of five fields: a name, a mobile phone number, a fixed-line phone number, an e-mail address, and an address. In this disclosure, a data object stored in a storage format has different version numbers. When a value of a field in the storage format changes, the version number of the data object also changes accordingly. This version number can be modified only by the cloud device. A change of the data object in the terminal device needs to be synchronized to the cloud device. A cloud side implements the synchronization and modifies the version number, and synchronizes the modified version number of the data object to the terminal device, to implement data synchronization between the cloud side and a terminal side. It may be learned from the first aspect that, when the terminal device responds to the operation of the application for the first data object, data consistency in synchronization between heterogeneous databases may be ensured by using indication functions of the version number field and the synchronization status field in the first storage format. In other words, the data consistency in the synchronization between the heterogeneous databases can be ensured in a version number management manner and a synchronization status management manner.

In a possible implementation of the first aspect, the operation is an insertion operation. The step that the terminal device modifies a first storage format of a first data object in the terminal device in response to an operation of an application for the first data object may include that, in response to the insertion operation of the application for the first data object, the terminal device separately fills the primary key field and the first field in the first storage format with a primary key and attribute information of the first data object included in the insertion operation. The terminal device changes a value of the version number field in the first storage format to a first version number. The terminal device changes a value of the synchronization status field in the first storage format to a first value, to indicate that the first storage format is in a to-be-synchronized state. Correspondingly, the synchronization response message further includes a second version number. The step that the terminal device performs a modification operation on the first storage format of the first data object in the terminal device in response to the synchronization response message may include that the terminal device changes the value of the version number field in the first storage format from the first version number to the second version number, and changes the value of the synchronization status field to a second value, to indicate that the first storage format is in a synchronized state.

In this possible implementation, the terminal device does not have a function of adjusting a version number. When the operation is the insertion operation, it indicates that the first data object is just established. In this case, an initial version number may be used as the first version number. For example, 0 is used as the first version number. If the cloud device returns a new version number in the synchronization response message, the first version number is replaced with the version number returned by the cloud device, that is, the first version number is replaced with the second version number. The value of the synchronization status field is modified to indicate that the first storage format is in the synchronized state. The first value may be, for example, 1 to indicate that synchronization is to be performed. The second value may be, for example, 0 to indicate that synchronization is completed. In this possible implementation, the data consistency is implemented between the cloud side and the terminal side through version number negotiation and modification in data synchronization based on the synchronization status field.

In a possible implementation of the first aspect, the operation is an update operation. The step that the terminal device modifies a first storage format of a first data object in the terminal device in response to an operation of an application for the first data object may include that the terminal device updates a value of the first field in the first storage format in response to the update operation of the application for the first data object. The terminal device changes a value of the version number field in the first storage format to a first version number. The terminal device changes a value of the synchronization status field in the first storage format to a first value, to indicate that the first storage format is in a to-be-synchronized state. Correspondingly, the synchronization response message further includes a second version number. The step that the terminal device performs a modification operation on the first storage format of the first data object in the terminal device in response to the synchronization response message may include that the terminal device changes the version number field in the first storage format from the first version number to the second version number, and changes the value of the synchronization status field in the first storage format to a second value, to indicate that the first storage format is in a synchronized state.

In this possible implementation, when the operation is the update operation, a value of an attribute in the first field is modified. For example, modifying a mobile phone number and deleting an address both belong to the update operation. In this case, a current version number of the first data object only needs to be determined as the first version number. If the cloud device returns a new version number in the synchronization response message, the first version number is replaced with the version number returned by the cloud device, that is, the first version number is replaced with the second version number. The value of the synchronization status field is modified to indicate that the first storage format is in the synchronized state, to implement data consistency between the cloud side and the terminal side.

In a possible implementation of the first aspect, the synchronization response message further includes a value of a first field in the second storage format. The method may further include that the terminal device updates the value of the first field in the first storage format based on the value of the first field in the second storage format.

In this possible implementation, if the version number of the first data object on the terminal side is different from the version number of the first data object on the cloud side in the synchronization process, existence of a version number conflict indicates that the first data object on the cloud side may be modified by another terminal device of the cloud device. In this case, the first data object stored in the cloud device may be selected as a reference. When the first data object stored in the cloud device is used as the reference, the cloud device sends, to the terminal device, data that is stored in the cloud device and that is different from data stored in the terminal device, that is, a field value of the data object in the cloud device. For example, if a mobile phone number stored in the terminal device is 13518475600 and a mobile phone number stored in the cloud device is 13318475600, 13318475600 may be carried in the synchronization response message. The terminal device replaces 13518475600 with 13318475600, and also replaces the version number with the second version number, to ensure data consistency between the cloud side and the terminal side.

In a possible implementation of the first aspect, the synchronization response message further includes a value of a first field in the second storage format. The method may further include that the terminal device determines an updated value of the first field based on the value of the first field in the first storage format and the value of the first field in the second storage format. The terminal device modifies the value of the first field in the first storage format by using the updated value of the first field. The terminal device sends the primary key, the updated value of the first field, and the second version number to the cloud device, so that the cloud device modifies the value of the first field in the second storage format by using the updated value of the first field. The terminal device receives a third version number and the primary key that are sent by the cloud device. The terminal device changes the version number field in the first storage format corresponding to the primary key from the second version number to the third version number.

In this possible implementation, if the version number of the first data object on the terminal side is different from the version number of the first data object on the cloud side in the synchronization process, existence of a version number conflict indicates that the first data object on the cloud side may be modified by another terminal device of the cloud device. In this case, the cloud-side data may be returned to the terminal device. The cloud-side data is the value of the first field in the second storage format. The terminal device may send the conflict event to a user by using an application through a register callback function, so that the user determines the updated value of the first field, that is, the value of the first field. Alternatively, the terminal device may not send the conflict event to the user, so that an internal conflict resolution mechanism of the terminal device determines the updated value of the first field. For example, when a conflict exists between the terminal device and the cloud device, after a mobile phone number 13518475600 stored in the terminal device and a mobile phone number 13318475600 stored in the cloud device are sent to the user by using a callback function, the user determines that the two numbers are both incorrect and a correct number is 13418475600, and determines that the updated value of the first field is 13418475600. Then, the terminal device replaces 13518475600 with 13418475600, and sends 13418475600 to the cloud device. The cloud device replaces 13518475600 with 13418475600. In addition, the cloud device needs to generate a new version number, for example, the third version number, mark attribute information of the latest first data object by using the third version number, and return the third version number to the terminal device. The terminal device changes the second version number to the third version number, to ensure data consistency between the cloud side and the terminal side.

In a possible implementation of the first aspect, the operation is a deletion operation. The first storage format of the first data object in the terminal device further includes a deletion indication field. The step that the terminal device modifies a first storage format of a first data object in the terminal device in response to an operation of an application for the first data object may include that the terminal device changes a value of the deletion indication field in the first storage format to a third value in response to the deletion operation of the application for the first data object, to indicate to delete the first data object. Correspondingly, the synchronization message further includes a deletion operation indication. That the terminal device performs a modification operation on the first storage format of the first data object in the terminal device in response to the synchronization response message may include that the terminal device deletes the first storage format of the first data object in the terminal device.

In this possible implementation, the third value may be a value such as 0 or 1, or may be an indication value such as true. When the operation is the deletion operation, the terminal device may delete the first data object from the terminal device after the terminal device indicates the cloud device that the first data object is to be deleted from the terminal device.

In a possible implementation of the first aspect, the synchronization response message further includes a maximum version number of a data object stored in the cloud device. The terminal device compares a synchronization baseline with the maximum version number. The synchronization baseline is an initial version number of the data object in the terminal device or a version number that is compared with a synchronization baseline at a previous time. When the synchronization baseline is different from the maximum version number, the terminal device sends a first synchronization request to the cloud device. The first synchronization request includes the synchronization baseline. The terminal device receives the primary key and the corresponding second version number of the first data object that are sent by the cloud device, and a primary key and a corresponding version number of a second data object that are sent by the cloud device. When a version number corresponding to the primary key of the first data object in the terminal device is the same as the second version number, the terminal device determines, based on the primary key of the second data object, that the second data object is not synchronized, and sends a second synchronization request to the cloud device. The second synchronization request includes the primary key of the second data object. Correspondingly, the terminal device receives the second data object. When a version number corresponding to the primary key of the first data object in the terminal device is different from the second version number, the terminal device determines, based on the primary key of the second data object, that the second data object is not synchronized, and sends a second synchronization request to the cloud device. The second synchronization request includes the primary key of the second data object and the primary key of the first data object. Correspondingly, the terminal device receives the second data object and the value of the first field in the second storage format. The terminal device adjusts the synchronization baseline to the maximum version number.

In this possible implementation, to ensure that the terminal device can obtain the data object in the cloud device in time, the cloud device adds, to the synchronization response message, the maximum version number of the data object stored in the cloud device. In this way, the terminal device may compare the synchronization baseline with the maximum version number, to determine that the data object in the terminal device is inconsistent with the data object in the cloud device. The terminal device may send the synchronization baseline to the cloud device. The cloud device searches for a data object corresponding to a version number higher than the synchronization baseline, and then sends a primary key and the corresponding version number of the data object to the terminal device. The terminal device may determine, based on the primary key of the data object, a data object that is not stored in the terminal device, and then send, to the cloud device, a primary key of the data object that is not stored in the terminal device, so that the cloud device can return the data object that is not stored in the terminal device to the terminal, to implement data consistency between the terminal side and the cloud side. In addition, if the version number of the data object in the terminal device is different from the version number in the cloud device, the terminal device also needs to request synchronization of latest information of the data object in the cloud device, to ensure consistency in each data object between the cloud side and the terminal side. In addition, the terminal device further adjusts the synchronization baseline to the maximum version number in time, for example, adjusts the synchronization baseline from 0 to 2. In this way, the cloud device repeatedly requesting the stored data object after sending the latest maximum version number can be avoided.

In a possible implementation of the first aspect, the method may further include that the terminal device sends version information of the application to the cloud device. The version information of the application is used by the cloud device to determine the first storage format of the first data object in the terminal device.

In this possible implementation, different terminal devices may use different versions of applications, and different versions of applications may correspond to different storage formats. In consideration of this, before the data synchronization, the cloud device needs to negotiate with the terminal device to determine a storage format used by the terminal device, so that the cloud device can send data in a format consistent with that in the terminal device.

A second aspect of this disclosure provides a data synchronization method, applied to a data synchronization process between heterogeneous databases. The heterogeneous databases may indicate that databases of a terminal device and a cloud device have different structures. For example, the terminal device generally uses an embedded database, and the cloud device generally uses a distributed database. The method is applied to the cloud device. The method may include that the cloud device receives a synchronization message sent by the terminal device. The synchronization message includes a primary key of a first data object. The first data object is stored in a first storage format in the terminal device. The cloud device modifies a second storage format of the first data object in the cloud device based on the synchronization message. The second storage format includes a primary key field used to store a primary key for uniquely identifying the first data object, a first field used to store an attribute for describing the first data object, and a version number field used to store a version number of the first data object. The cloud device sends a synchronization response message to the terminal device. The synchronization response message includes the primary key. The synchronization response message is used by the terminal device to perform a modification operation on the first storage format of the first data object in the terminal device.

In the technical solutions provided in the second aspect, the cloud device stores the first data object in the second storage format. The primary key is generally used to uniquely identify a data object. Therefore, the data object may be searched for by using the primary key. The attribute of the first field may be information such as a name, a mobile phone number, a fixed-line phone number, an e-mail address, and an address. The second storage format may further include a deletion indication field. Indication information in the deletion indication field is used to indicate whether the operation is a deletion operation or a non-deletion operation. The attribute of the first field may be information such as a name, a mobile phone number, a fixed-line phone number, an e-mail address, and an address in an address book. The second storage format indicates a storage format of the first data object in the terminal device. The storage format corresponds to a version of an application. For example, when the application version is 1.1.0, the first storage format of the address book may include information of three fields: a name, a mobile phone number, and a fixed-line phone number. When the application version is 1.2.0, the first storage format of the address book may include information of five fields: a name, a mobile phone number, a fixed-line phone number, an e-mail address, and an address. In this disclosure, a data object stored in a storage format has different version numbers. When a value of a field in the storage format changes, the version number of the data object also changes accordingly. This version number can be modified only by the cloud device. A change of a data object in the terminal device needs to be synchronized to the cloud device. The cloud side implements the synchronization and modifies the version number, and synchronizes the modified version number of the data object to the terminal device, to implement data synchronization between a cloud side and a terminal side. It may be learned from the second aspect that, when first field information of a data object changes in the terminal device and/or the cloud device, data consistency in synchronization between heterogeneous databases may be ensured by using indication functions of the version number field and the synchronization status field in the first storage format and the version number field in the second storage format. In other words, the data consistency in the synchronization between heterogeneous databases can be ensured in a version number management manner and a synchronization status management manner.

In a possible implementation of the second aspect, the synchronization message further includes attribute information of the first data object. The step that the cloud device modifies a second storage format of the first data object in the cloud device based on the synchronization message may include that the cloud device separately fills the primary key field and the first field in the second storage format with the primary key and the attribute information of the first data object based on the synchronization message. The cloud device determines a second version number for the first data object, and fills the version number field in the second storage format with the second version number.

In this possible implementation, when the operation is an insertion operation, it indicates that the cloud device does not store the first data object before. The primary key field and the first field in the second storage format are filled with the primary key of the first data object and a value of the attribute of the first field. The second version number is generated and filled in the version number field. Then, the second version number is sent to the terminal device by using the synchronization response message, to indicate the terminal device to also use the second version number, thereby ensuring data consistency between the cloud side and the terminal side.

In a possible implementation of the second aspect, the synchronization message further includes a first version number and attribute information of the first data object. The step that the cloud device modifies a second storage format of the first data object in the cloud device based on the synchronization message may include that the cloud device determines a version number in the version number field in the second storage format based on the primary key of the first data object. When the first version number is the same as the version number in the version number field in the second storage format, the cloud device updates the first field in the second storage format by using the attribute information of the first data object. The cloud device determines a second version number for the first data object, and updates the version number field in the second storage format by using the second version number.

In this possible implementation, when the operation is an update operation, a version number conflict needs to be detected through comparison between version numbers. When no version number conflict exists, the cloud device only needs to update a corresponding field, generate a new version number, and send the new version number to the terminal device, to ensure data consistency between the cloud side and the terminal side.

In a possible implementation of the second aspect, the method may further include, when the first version number is different from the version number in the version number field in the second storage format, the cloud device adds a value of the first field in the second storage format to the synchronization response message.

In this possible implementation, existence of a version number conflict indicates that the first data object on the cloud side may be modified by another terminal device of the cloud device. In this case, the first data object stored in the cloud device may be selected as a reference. When the first data object stored in the cloud device is used as the reference, the cloud device adds data different from that in the terminal device to the synchronization response message. For example, if a mobile phone number stored in the terminal device is 13518475600 and a mobile phone number stored in the cloud device is 13318475600, updated information may be 13318475600. The terminal device replaces 13518475600 with 13318475600, and also replaces the version number with the second version number, to ensure data consistency between the cloud side and the terminal side.

In a possible implementation of the second aspect, the method may further include, when the first version number is different from the version number in the version number field in the second storage format, the cloud device adds a value of the first field in the second storage format to the synchronization response message. The cloud device receives the primary key of the first data object, an updated value of the first field, and the second version number that are sent by the terminal device. When the cloud device determines that the second version number is the same as the version number in the version number field in the second storage format, the cloud device modifies the value of the first field in the second storage format by using the updated value of the first field. The cloud device determines a third version number for the first data object. The third version number is different from the first version number and the second version number. The cloud device sends the third version number and the primary key of the first data object to the terminal device, so that the terminal device changes the version number field in the first storage format corresponding to the primary key from the second version number to the third version number.

In this possible implementation, existence of a version number conflict indicates that the first data object on the cloud side may be modified by another terminal device of the cloud device. In this case, cloud-side data, that is, the value of the first field in the second storage format may be returned to the terminal device. The terminal device may send the conflict event to a user by using an application through a register callback function, so that the user determines the updated value of the first field. Alternatively, the terminal device may not send the conflict event to the user, so that an internal conflict resolution mechanism of the terminal device determines the updated value of the first field. For example, when a conflict exists between the terminal device and the cloud device, after a mobile phone number 13518475600 stored in the terminal device and a mobile phone number 13318475600 stored in the cloud device are sent to the user by using a callback function, the user determines that the two numbers are both incorrect and a correct number is 13418475600, and determines that the updated value of the first field is 13418475600. Then, the terminal device replaces 13518475600 with 13418475600, and sends 13418475600 to the cloud device. The cloud device replaces 13518475600 with 13418475600. In addition, the cloud device needs to generate a new version number, for example, the third version number, mark the latest first data object by using the third version number, and return the third version number to the terminal device. The terminal device changes the second version number to the third version number, to ensure data consistency between the cloud side and the terminal side.

In a possible implementation of the second aspect, the synchronization message further includes a deletion operation indication. The step that the cloud device modifies a second storage format of the first data object corresponding to the first primary key based on the synchronization message may include that the cloud device changes a deletion indication field in a second storage field to a deletion indication based on the deletion operation indication.

In this possible implementation, the second storage format of the first data object in the cloud device further includes the deletion indication field, and the synchronization message further includes the deletion operation indication. The step that the cloud device modifies a second storage format of the first data object in the cloud device based on the synchronization message may include that the cloud device changes a value of the deletion indication field in the second storage format to a value used to indicate to delete the first data object.

In a possible implementation of the second aspect, the synchronization response message further includes a maximum version number of a data object stored in the cloud device. The cloud device receives a first synchronization request sent by the terminal device. The first synchronization request includes a synchronization baseline maintained in the terminal device. The synchronization baseline is an initial version number of the data object in the terminal device or a version number that is compared with a synchronization baseline in the terminal device at a previous time. The cloud device determines a data object whose version number is higher than the synchronization baseline. The cloud device sends the primary key and the corresponding second version number of the first data object, and a primary key and a corresponding version number of a second data object to the terminal device. The cloud device receives a second synchronization request sent by the terminal device. The second synchronization request includes the primary key of the second data object, or the second synchronization request includes the primary key of the second data object and the primary key of the first data object. The cloud device determines the second data object based on the primary key of the second data object, or determines the second data object based on the primary key of the second data object, and determines the first data object based on the primary key of the first data object. The cloud device sends the second data object, or the second data object and the value of the first field in the second storage format to the terminal device.

In this possible implementation, to ensure that the terminal device can obtain the data object in the cloud device in time, the cloud device adds, to the synchronization response message, the maximum version number of the data object stored in the cloud device. In this way, the terminal device may compare the synchronization baseline with the maximum version number, to determine that the data object in the terminal device is inconsistent with the data object in the cloud device. The terminal device may send the synchronization baseline to the cloud device. The cloud device searches for a data object corresponding to a version number higher than the synchronization baseline, and then sends a primary key and the corresponding version number of the data object to the terminal device. The terminal device may determine, based on the primary key of the data object, a data object that is not stored in the terminal device, and then send, to the cloud device, a primary key of the data object that is not stored in the terminal device, so that the cloud device can return the data object that is not stored in the terminal device to the terminal, to implement data consistency between the terminal side and the cloud side. In addition, if the version number of the data object in the terminal device is different from the version number in the cloud device, the terminal device also needs to request synchronization of latest information of the data object in the cloud device, to ensure consistency in each data object between the cloud side and the terminal side. In addition, the terminal device further adjusts the synchronization baseline to the maximum version number in time, for example, adjusts the synchronization baseline from 0 to 2. In this way, the cloud device repeatedly requesting the stored data object after sending the latest maximum version number can be avoided.

In a possible implementation of the second aspect, the method may further include that the cloud device receives version information of an application that is sent by the terminal device. The cloud device determines the first storage format of the first data object in the terminal device based on the version information of the application.

In this possible implementation, different terminal devices may use different versions of applications, and different versions of applications may correspond to different storage formats. In consideration of this, before the data synchronization, the cloud device needs to negotiate with the terminal device to determine a storage format used by the terminal device, so that the cloud device can send data in a format consistent with that in the terminal device.

A third aspect of this disclosure provides a terminal device configured to perform the method according to the first aspect or any one of the possible implementations of the first aspect. Further, the apparatus includes modules or units configured to perform the method according to the first aspect or any one of the possible implementations of the first aspect.

A fourth aspect of this disclosure provides a cloud device configured to perform the method according to the second aspect or any one of the possible implementations of the second aspect. Further, the apparatus includes modules or units configured to perform the method according to the second aspect or any one of the possible implementations of the second aspect.

A fifth aspect of this disclosure provides a terminal device. The terminal device may include at least one processor, a memory, and a communication interface. The processor is coupled to the memory and the communication interface. The memory is configured to store instructions. The processor is configured to execute the instructions. The communication interface is configured to communicate with another network element under control of the processor. When the instructions are executed by the processor, the processor is enabled to perform the method according to the first aspect or any one of the possible implementations of the first aspect.

A sixth aspect of this disclosure provides a cloud device. The cloud device may include at least one processor, a memory, and a communication interface. The processor is coupled to the memory and the communication interface. The memory is configured to store instructions. The processor is configured to execute the instructions. The communication interface is configured to communicate with another network element under control of the processor. When the instructions are executed by the processor, the processor is enabled to perform the method according to the second aspect or any one of the possible implementations of the second aspect.

A seventh aspect of this disclosure provides a computer readable storage medium. The computer readable storage medium stores a program. The program enables a terminal device to perform the method according to the first aspect or any one of the possible implementations of the first aspect.

An eighth aspect of this disclosure provides a computer readable storage medium. The computer readable storage medium stores a program. The program enables a cloud device to perform the method according to the second aspect or any one of the possible implementations of the second aspect.

A ninth aspect of this disclosure provides a computer program product. The computer program product includes a computer executable instruction. The computer executable instruction is stored in a computer readable storage medium. At least one processor of a device may read the computer executable instruction from the computer readable storage medium. When the at least one processor executes the computer executable instruction, the device is enabled to implement the method according to the first aspect or any one of the possible implementations of the first aspect.

A tenth aspect of this disclosure provides a computer program product. The computer program product includes a computer executable instruction. The computer executable instruction is stored in a computer readable storage medium. At least one processor of a device may read the computer executable instruction from the computer readable storage medium. When the at least one processor executes the computer executable instruction, the device is enabled to implement the method according to the second aspect or any one of the possible implementations of the second aspect.

An eleventh aspect of this disclosure provides a chip system. The chip system includes a processor configured to support a terminal device in implementing the functions in the first aspect or any one of the possible implementations of the first aspect. In a possible design, the chip system may further include a memory. The memory is configured to store a program instruction and data that are necessary for the terminal device. The chip system may include a chip, or may include a chip and another discrete component.

A twelfth aspect of this disclosure provides a chip system. The chip system includes a processor configured to support a cloud device in implementing the functions in the second aspect or any one of the possible implementations of the second aspect. In a possible design, the chip system may further include a memory. The memory is configured to store a program instruction and data that are necessary for the cloud device. The chip system may include a chip, or may include a chip and another discrete component.

A thirteenth aspect of this disclosure provides a data synchronization system, including a cloud device and at least one terminal device. The terminal device is the terminal device that implements the method according to the first aspect or any one of the possible implementations of the first aspect. The cloud device is the cloud device that implements the method according to the second aspect or any one of the possible implementations of the second aspect.

For technical effects brought by any one of the third aspect, the fifth aspect, the seventh aspect, the ninth aspect, and the eleventh aspect or the possible implementations thereof, refer to the technical effects brought by the first aspect or the different possible implementations of the first aspect. Details are not described herein again.

For technical effects brought by any one of the fourth aspect, the sixth aspect, the eighth aspect, the tenth aspect, and the twelfth aspect or the possible implementations thereof, refer to the technical effects brought by the second aspect or the different possible implementations of the second aspect. Details are not described herein again.

In the solutions provided in the embodiments of this disclosure, when data objects in the terminal device and the cloud device change, data consistency in synchronization between heterogeneous databases may be ensured in a version number management manner and a synchronization status management manner.

DESCRIPTION OF EMBODIMENTS

The following describes embodiments of this disclosure with reference to the accompanying drawings. It is clear that the described embodiments are merely some but not all of the embodiments of this disclosure. A person of ordinary skill in the art may know that, with development of technologies and emergence of new scenarios, technical solutions provided in embodiments of this disclosure are also applicable to similar technical problems.

In the specification, claims, and accompanying drawings of this disclosure, the terms "first", "second", and so on are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "have" and any other variants mean to cover the non-exclusive inclusion, for example, a process, method, system, product, or device that includes a series of steps or units is not necessarily limited to those steps or units, but may include other steps or units not expressly listed or inherent to such a process, method, product, or device.

Embodiments of this disclosure provide a data synchronization method, to ensure data consistency in synchronization between heterogeneous databases in a version negotiation manner. Embodiments of this disclosure further provide a corresponding device. Detailed descriptions are separately provided in the following.

Figure 1:
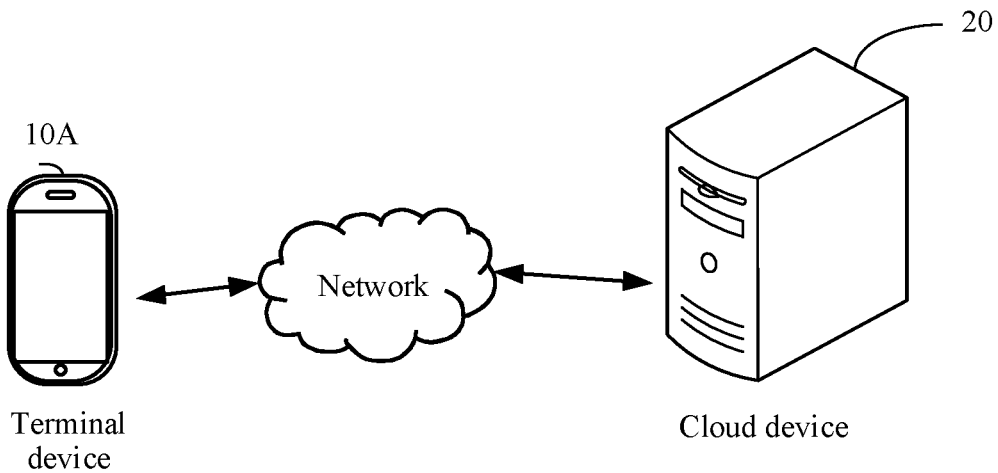
FIG. 1 is a schematic diagram of an embodiment of a data synchronization system according to an embodiment of this disclosure.

FIG. 1 is a schematic diagram of an embodiment of a data synchronization system according to an embodiment of this disclosure.

As shown in FIG. 1, the embodiment of the data synchronization system provided in this embodiment of this disclosure includes a terminal device 10A and a cloud device 20. The terminal device 10A is connected to the cloud device 20 through network communication. Data synchronization may be implemented between the terminal device 10A and the cloud device 20 by using a network. The terminal device generally uses an embedded database, and the cloud device generally uses a distributed database. Therefore, the database of the terminal device and the database of the cloud device are heterogeneous databases.

Figure 2:
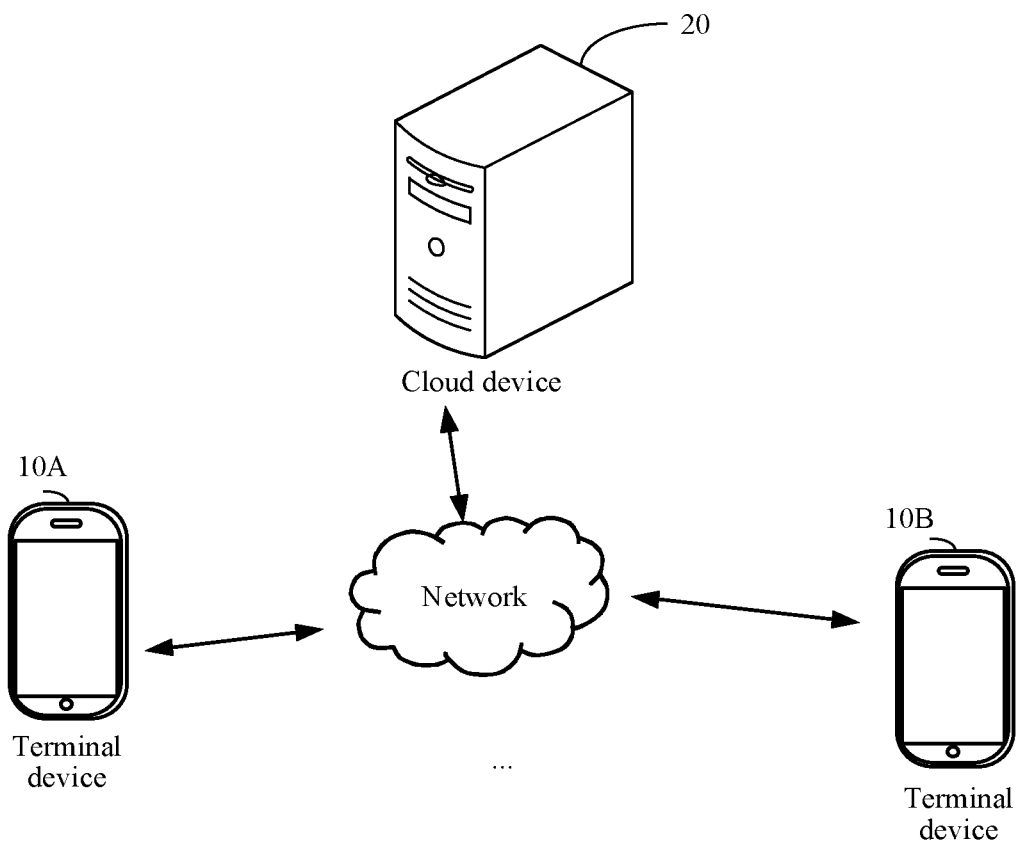
FIG. 2 is a schematic diagram of another embodiment of a data synchronization system according to an embodiment of this disclosure.

FIG. 1 shows only one terminal device. Actually, a synchronization system of heterogeneous databases may be related to a plurality of terminal devices. FIG. 2 is a schematic diagram of another embodiment of a data synchronization system. The data synchronization system includes a terminal device 10A, a terminal device 10B, and a cloud device 20. The terminal device 10A and the terminal device 10B are connected to the cloud device 20 through network communication.

The cloud device in this embodiment of this disclosure may be a resource set having a data synchronization function, may be an independent computer device, or may be a cluster including a plurality of independent computer devices. Alternatively, the cloud device may be a virtual machine (VM).

The terminal device (or a user equipment (UE)) is a device having wireless transmission and reception functions, and may be deployed on land, for example, an indoor or outdoor device, a handheld device, or a vehicle-mounted device, or may be deployed on water (for example, on a steamship), or may be deployed in the air (for example, on an airplane, a balloon, or a satellite). The terminal may be a mobile phone, a tablet computer (or IPAD), a computer having wireless transmission and reception functions, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

The data synchronization principles provided in the embodiments of this disclosure are the same no matter whether the data synchronization is implemented between the cloud device and one terminal device or between the cloud device and a plurality of terminal devices. Based on the foregoing data synchronization system shown in FIG. 1 or FIG. 2, the following describes a data synchronization method provided in an embodiment of this disclosure with reference to FIG. 3.

Figure 3:
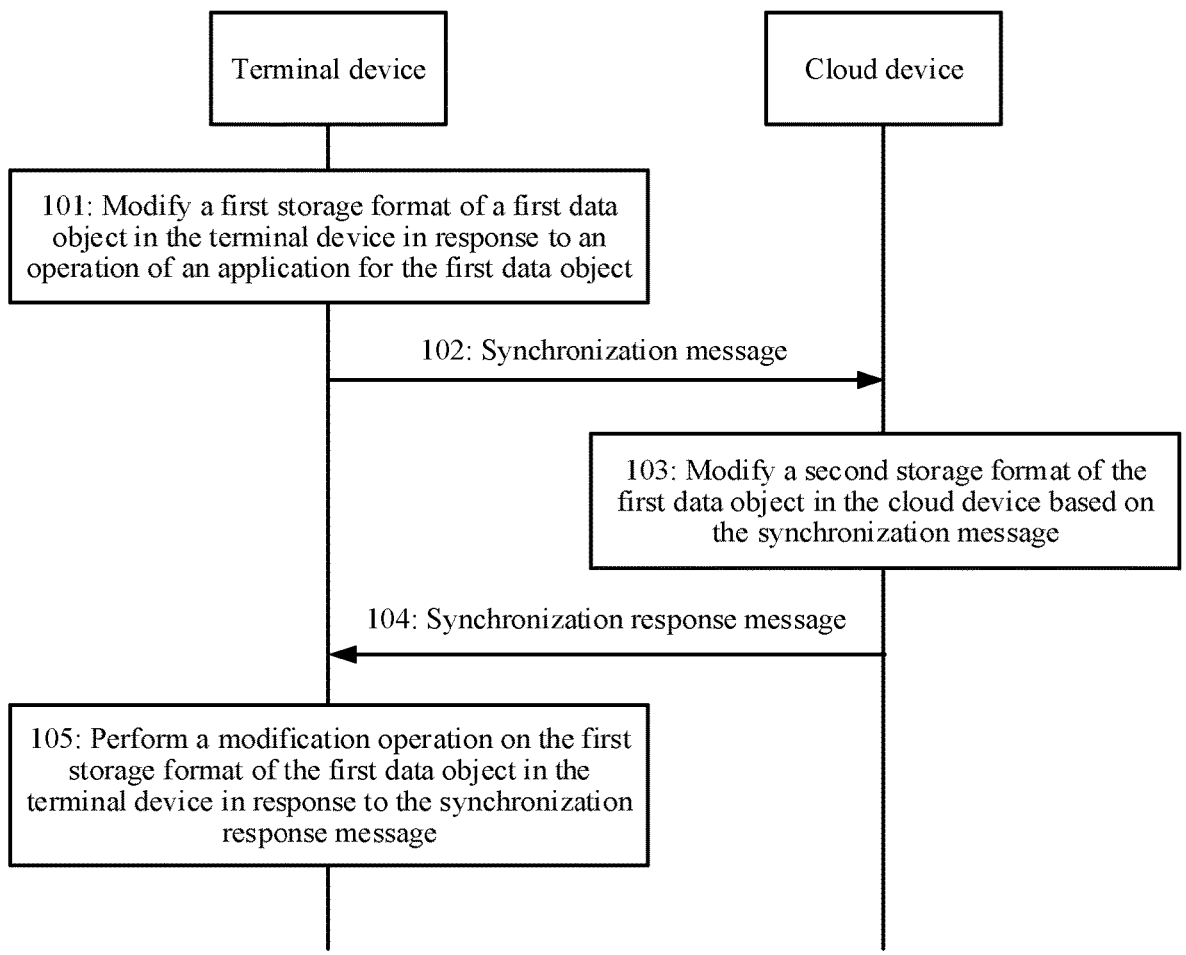
FIG. 3 is a schematic diagram of an embodiment of a data synchronization method according to an embodiment of this disclosure.

As shown in FIG. 3, an embodiment of the data synchronization method provided in this embodiment of this disclosure may include the following steps.

101: A terminal device modifies a first storage format of a first data object in the terminal device in response to an operation of an application for the first data object.

The first storage format is a storage form of the first data object in the terminal. The first storage format may be considered as a data record or a data structure. Further, the first storage format includes a primary key field used to store a primary key for uniquely identifying the first data object, a first field used to store an attribute for describing the first data object, a version number field used to store a version number of the first data object, and a synchronization status field.

The application may be an application such as an address book, a gallery, or list management.

When the application is the address book, the first data object may be a contact, and the attribute of the first field may be information such as a name, a fixed-line phone number, a mobile phone number, an e-mail address, and an address of the contact.

When the application is the gallery, the first data object may be a picture, and the attribute of the first field may be information such as a length, a width, a color, and an attribute of the picture.

When the application is the list management, and student management information is used as an example, the first data object may be student information, and the attribute of the first field may be information such as a name, a gender, and an age of the student.

Each data object corresponds to one primary key. The primary key is usually used to uniquely identify the data object.

The operation for the first data object may include an insertion operation, an update operation, a deletion operation, a query operation, and the like. The update operation may include modification and partial deletion.

The following describes a specific example of the first storage format. A data object "student" is used as an example. A storage format of the data object in the terminal device is shown in Table 1.

referred to as an attribute field used to describe various attributes of the "student". The version number field, the field used to describe a change in each value in the first storage field, the synchronization status field, and the deletion indication field are collectively referred to as the second storage field that may be alternatively referred to as a system field that is designed for data synchronization between a cloud side and a terminal side. The first storage field and the second storage field have no specific meaning. Classification processing may also not be performed.

In Table 1, the version number is used to identify a quantity of change times of the first data object. The version number generally monotonically increases. The version number is determined by the cloud device. A version number initially used by the terminal device may be 0. Then, the version number is updated based on a result fed back by the cloud device in each synchronization process. Optionally, the "changed field" may be used to describe a field (changed_fields_map) whose value changes in the first storage field. For example, one bit is used to indicate each field in the first storage field. Table 1 is used as an example. If no field included in the first storage field changes, it may be represented as 0000. If the age changes, it may be represented as 0001. For the synchronization status, 0 may be used to indicate that synchronization is completed, 1 may be used to indicate that synchronization is required, and 2 may be used to indicate that synchronization is being performed. Certainly, the synchronization statuses represented by 0, 1, and 2 herein are merely examples used for description. A specific representation manner is not limited to the three types: 0, 1, and 2. A correspondence between the representation manner and the synchronization status corresponding to the representation manner is not limited to the foregoing described correspondence. The deletion indication field indicates whether to perform deletion. If the deletion operation is performed, the field is represented by true. When the deletion operation is not performed, the field is represented by false. Certainly, 0 may also be used to represent a non-deletion operation, and 1 may be used to represent a deletion operation. This is not limited herein.

102: The terminal device sends a synchronization message to the cloud device, and correspondingly, the cloud device receives the synchronization message sent by the terminal device.

TABLE 1

| First storage format of a data object "student" |||||||||
|---|---|---|---|---|---|---|---|---|
| First storage field |||||| Second storage field |||
| Field name | Primary key | Name | Gender | Age | Version number (version) | Changed field (changed_fields_map) | Synchronization status (sync_status) | Deleted (deleted) |
| Field type | Integer (int) | Character string (string) | String | int | int | Binary (BLOB) | int | Boolean value (BOOLEAN) |

In the first storage format, the primary key field and the field used to describe the attribute of the first data object, for example, a name, a gender, and an age are collectively referred to as the first storage field. These fields are generally defined by an application developer. The name, the gender, and the age all belong to the first field that is alternatively The synchronization message includes the primary key of the first data object.

103: The cloud device modifies a second storage format of the first data object in the cloud device based on the synchronization message.

The cloud device stores a copy of the first data object, and the cloud device stores the first data object by using the second storage format. The second storage format is a storage form of the first data object in the cloud device. The second storage format is a data record or a data structure. Further, the second storage format includes a primary key field used to store a primary key for uniquely identifying the first data object, a first field used to store an attribute for describing the first data object, and a version number field used to store a version number of the first data object.

In correspondence with the foregoing first storage format, when student information is still used as an example, the second storage format may be understood with reference to Table 2.

TABLE 2

Second storage format of a data object "student"

| | First storage field | | | | Second storage field | |
|---|---|---|---|---|---|---|
| Field name | Primary key | Name | Gender | Age | Version number (version) | Deleted (deleted) |
| Field value | Integer (int) | Character (string) | String | int | int | Boolean value (BOOLEAN) |

In the first storage format, the primary key field and the field used to describe the attribute of the first data object, for example, a name, a gender, and an age are collectively referred to as the first storage field. The version number field and the deletion indication field are collectively referred to as the second storage field. The first storage field and the second storage field have no specific meaning. Classification processing may also not be performed.

In the foregoing Table 2, a corresponding meaning of each field may be understood with reference to a corresponding explanation in Table 1.

104: The cloud device sends a synchronization response message to the terminal device, and correspondingly, the terminal device receives the synchronization response message sent by the cloud device.

The synchronization response message includes the primary key of the first data object.

105: The terminal device performs a modification operation on the first storage format of the first data object in the terminal device in response to the synchronization response message.

In the solutions provided in this embodiment of this disclosure, when data objects in the terminal device and the cloud device change, data consistency in synchronization between heterogeneous databases may be ensured in a version number management manner and a synchronization status management manner.

Specific execution processes of steps 101, 103, and 105 are related to the operation for the first data object. Because a query process is not related to update of a data object, data synchronization is not performed for the query operation. The insertion operation, the update operation, and the deletion operation are all related to the data synchronization process. Based on the insertion operation, the update operation, and the deletion operation, the following separately describes the data synchronization method provided in this embodiment of this disclosure.

1. Insertion Operation:

When the operation for the first data object is the insertion operation, step 101 may include the following.

In response to the insertion operation of the application for the first data object, the terminal device separately fills the primary key field and the first field in the first storage format with a primary key and attribute information of the first data object included in the insertion operation.

The terminal device changes a value of the version number field in the first storage format to a first version number.

The terminal device changes a value of the synchronization status field in the first storage format to a first value, to indicate that the first storage format is in a to-be-synchronized state.

The process may be represented in the form shown in Table 3 with reference to the description of Table 1.

TABLE 3

First storage format of a data object "student"

| | First storage field | | | | Second storage field | | |
|---|---|---|---|---|---|---|---|
| Field name | Primary key | Name | Gender | Age | Version | changed_ fields_ map | sync_ status | Deleted |
| Field value | 1 | Wang Hai | Male | 18 | 0 | 1111 | 1 | False |

With reference to Table 3, the primary key is 1, and the attribute information of the first field includes Wang Hai, Male, and 18 years old. Because the operation is the insertion operation, the version number may start from 0. Because all four fields in the first storage field change, changed_fields_map is marked as 1111, sync_status is marked as 1 to indicate that synchronization is required or to be performed, and the deletion indication field is marked as false to indicate that the operation is not a deletion operation.

When step 102 is performed, the primary key of the first data object in the synchronization message in this example is the primary key 1, and the synchronization message further includes the attribute information of the first field of Wang Hai, Male, and 18 years old, and may further include an insertion operation indication. If sync_status changes from synchronization required to synchronization being performed, the data object in the example shown in Table 3 stored in the terminal device may be represented as Table 4.

TABLE 4

First storage format of a data object "student"

| | First storage field | | | | Second storage field | | |
|---|---|---|---|---|---|---|---|
| | Field name | | | | | | |
| | Primary key | Name | Gender | Age | Version | changed_ fields_ map | sync_ status | Deleted |
| Field value | 1 | Wang Hai | Male | 18 | 0 | 1111 | 2 | False |

After the cloud device receives the synchronization message, step 103 may include the following.

The cloud device separately fills the primary key field and the first field in the second storage format with the primary key and the attribute information of the first data object based on the synchronization message.

The cloud device determines a second version number for the first data object, and fills the version number field in the second storage format with the second version number.

The step may further include that the cloud device fills the deletion indication field in the second storage format with a deletion indication according to the insertion operation indication. If a student Du Huahua is already stored in the cloud device, and a current version number of the student is 1, the version number of the first data object synchronized from the terminal device, that is, a student Wang Hai is 2. The cloud device manages version numbers of all students in a unified manner. To be specific, the cloud device may manage the version numbers in a manner of adding 1 in each time of modification from 1.

The process may be represented in a form shown in Table 5 with reference to the description of Table 2.

TABLE 5

Second storage format of a data object "student"

| | First storage field | | | | Second storage field | |
|---|---|---|---|---|---|---|
| | | | Field name | | | |
| | Primary key | Name | Gender | Age | Version number (version) | Deleted (deleted) |
| Field value | 1 | Wang Hai | Male | 18 | 2 | False |

With reference to Table 5, it may be learned that the cloud device determines, based on the primary key 1, that the first data object in the example in Table 4 is not stored. In this case, the cloud device fills the first field in the second storage format with the primary key 1 and the attribute information of the first field: Wang Hai, Male, and 18 years old. The cloud device determines the second version number for the current storage of the data object whose primary key is 1. For example, the second version number is 2. The deletion indication field is filled with non-deletion operation information: False. In the examples in Table 3 to Table 5, the first version number is 0, and the second version number is 2. Certainly, the version number herein is merely an example, and should not be understood as a limitation on representation of a version number.

The synchronization response message sent by the cloud device to the terminal device includes the primary key and the second version number of the first data object. Step 105 may include that the terminal device changes the value of the version number field in the first storage format from the first version number to the second version number, and changes the value of the synchronization status field to a second value, to indicate that the first storage format is in a synchronized state.

Still in the example in Table 4, after the first version number 0 is changed to the second version number 2, sync_status also needs to be changed from 2 to 0 to indicate that the synchronization is completed. In addition, changed_fields_map also needs to be changed to 0000. A result of this example may be understood with reference to Table 6.

TABLE 6

First storage format of a data object "student"

| | First storage field | | | | Second storage field | | |
|---|---|---|---|---|---|---|---|
| | | | Field name | | | | |
| | Primary key | Name | Gender | Age | Version | changed_fields_map | sync_status Deleted |
| Field value | 1 | Wang Hai | Male | 18 | 2 | 0000 | 0 False |

In the insertion operation process, information in the second storage field is modified in time through version number negotiation and a change in the data synchronization process, to ensure data consistency between the cloud side and the terminal side.

2. Update Operation:

When the operation for the first data object is the update operation, the process in step 101 may include the following.

The terminal device updates a value of the first field in the first storage format in response to the update operation of the application for the first data object.

The terminal device changes a value of the version number field in the first storage format to a first version number.

The terminal device changes a value of the synchronization status field in the first storage format to a first value, to indicate that the first storage format is in a to-be-synchronized state.

The process may be represented in the form shown in Table 7 based on Table 6.

TABLE 7

First storage format of a data object "student"

| | First storage field | | | | Second storage field | | |
|---|---|---|---|---|---|---|---|
| | | | Field name | | | | |
| | Primary key | Name | Gender | Age | Version | changed_fields_map | sync_status Deleted |
| Field value | 1 | Wang Hai | Male | 23 | 2 | 0001 | 1 False |

With reference to Table 7, an age of a data object whose primary key is 1 in the terminal device is updated from 18 to 23. The terminal device needs to synchronize the modified attribute information of the modified first field with the cloud device. Because only the age field is modified, changed_fields_map is represented as 0001, and sync_status is changed from 0 to 1. In addition, when the synchronization message is sent, sync_status is changed from 1 to 2. For example, refer to the field: sync_status in Table 4 for understanding.

The first primary key in the synchronization message in step 102 is the primary key 1. The synchronization message further includes a version number: 2 and an age: 23 years old. After the cloud device receives the synchronization message, step 103 may be performed and may include the following.

The cloud device determines a version number in the version number field in the second storage format based on the primary key of the first data object.

When the first version number is the same as the version number in the version number field in the second storage format, the cloud device updates the first field in the second storage format by using the attribute information of the first data object.

The cloud device determines a second version number for the first data object, and updates the version number field in the second storage format by using the second version number. The deletion indication field in the second storage field is a non-deletion indication.

With reference to the example in Table 7, the cloud device determines, based on the primary key 1, that the version number of the data object in the cloud device is 2. The version number in the synchronization message is also 2. Version numbers on both the cloud side and the terminal side are the same. A version number conflict does not exist. Therefore, the age field: 18 in Table 5 is changed to 23, and a new version number 3 is determined. The deletion indication field is still marked as false because the operation is the update operation. In this way, content shown in Table 8 is obtained.

TABLE 8

Second storage format of a data object "student"

| | First storage field | | | Second storage field | |
|---|---|---|---|---|---|
| | | | Field name | | |
| | Primary key | Name | Gender | Age | Version number (version) | Deleted (deleted) |
| Field value | 1 | Wang Hai | Male | 23 | 3 | False |

Still in the example of the insertion operation, the first version number in the update operation is 2, and the second version number is 3. The new version number can be obtained by adding 1 to the version number of the previous version.

After Table 8 is obtained through synchronization, the cloud device adds the version number 3 and the primary key 1 to a synchronization response, so that the terminal device can update Table 7 to obtain Table 9 consistent with the data in the cloud device.

TABLE 9

First storage format of a data object "student"

| | First storage field | | | | Second storage field | | |
|---|---|---|---|---|---|---|---|
| | | | | Field name | | | |
| | Primary key | Name | Gender | Age | Version | changed_ fields_ map | sync_ status | Deleted |
| Field value | 1 | Wang Hai | Male | 23 | 3 | 0000 | 0 | False |

Table 8 and Table 9 are obtained when no conflict exists between the version numbers on both the cloud side and the terminal side. Alternatively, a conflict may exist between the version numbers on the cloud side and the terminal side. This is described below.

For example, information about the age field in the cloud device is modified on the basis of Table 5, for example, changed to content shown in Table 10.

TABLE 10

Second storage format of a data object "student"

| | First storage field | | | Second storage field | |
|---|---|---|---|---|---|
| | | | Field name | | |
| | Primary key | Name | Gender | Age | Version number (version) | Deleted (deleted) |
| Field value | 1 | Wang Hai | Male | 25 | 3 | False |

Based on Table 5, the age field in the cloud device is changed from 18 to 25. The cloud device adjusts the version number due to this time of modification. If the version number in Table 5 is 2, 1 is added to the version number, and the version number is changed to 3.

The synchronization message in step 103 carries the primary key 1, the version number 2, and the age 23. The cloud device compares the version numbers to confirm that the two version numbers are different and the version number conflict exists. When the version number conflict exists, the conflict may be resolved in two manners. One is using the data on the cloud side as a reference. The other is returning the data on the cloud side to the terminal device to resolve the conflict in the terminal device.

When the data on the cloud side is used as the reference, and the first version number is different from the version number in the version number field in the second storage format, the cloud device adds a value of the first field in the second storage format to the synchronization response message.

In other words, the cloud device adds the age: 25 years old, the primary key 1, and the version number 3 to the synchronization response message.

After the terminal device receives the synchronization response message, the terminal device updates the value of the first field in the first storage format based on the value of the first field in the second storage format.

In other words, after finding the corresponding first data object based on the primary key 1, the terminal device changes 23 years old in the age field to 25 years old, and changes the version number from 2 to 3 to obtain content shown in Table 11.

TABLE 11

First storage format of a data object "student"

| | First storage field | | | | Second storage field | | |
|---|---|---|---|---|---|---|---|
| | | | | Field name | | | |
| | Primary key | Name | Gender | Age | Version | changed_ fields_ map | sync_ status | Deleted |
| Field value | 1 | Wang Hai | Male | 25 | 3 | 0001 | 1 | False |

Because the terminal device modifies the age field, synchronization needs to be performed again. The synchronization message carries the age 25, the version number 3, and the primary key 1. The version numbers of the data objects for the primary key 1 on the cloud side and the terminal side at this time are both 3. No version number conflict exists. Therefore, the cloud device changes the version number in the cloud device to 4, and then synchronizes the version number 4 to the terminal device. Finally, the cloud device obtains a result shown in Table 12, and the terminal device obtains a result shown in Table 13.

TABLE 12

Second storage format of a data object "student"

| | First storage field | | | Second storage field | |
|---|---|---|---|---|---|
| | | | Field name | | |
| | Primary key | Name | Gender | Age | Version number (version) | Deleted (deleted) |
| Field value | 1 | Wang Hai | Male | 25 | 4 | False |

TABLE 13

First storage format of a data object "student"

| | First storage field | | | | Second storage field | | |
|---|---|---|---|---|---|---|---|
| | | | Field name | | | | |
| | Primary key | Name | Gender | Age | Version sion | changed_ fields_ map | sync_ status | Deleted |
| Field value | 1 | Wang Hai | Male | 25 | 4 | 0000 | 0 | False |

For the results in Table 11 to Table 13, the conflict is resolved by using the data on the cloud side as a reference. The following describes a case in which the terminal device resolves the conflict.

An application in the terminal device may resolve the conflict by using a register callback function (registerConflictCallBack).

When the first version number is different from the version number in the version number field in the second storage format, the cloud device adds a value of the first field in the second storage format to the synchronization response message.

Still in the foregoing example, the cloud device adds the age: 25 years old, the primary key 1, and the version number 3 to the synchronization response message.

The terminal device determines an updated value of the first field based on the value of the first field in the first storage format and the value of the first field in the second storage format. The process may be that the terminal device may send the conflict event to a user by using the register callback function and the user determines the updated value of the first field, or the terminal device may not send the conflict event to a user and the terminal device determines the updated value of the first field by using an internal conflict resolution mechanism. For example, the updated value of the first field that is determined by the terminal device is 24.

The terminal device modifies the value of the first field in the first storage format by using the updated value of the first field.

The terminal device sends the primary key, the updated value of the first field, and the second version number to the cloud device, so that the cloud device modifies the value of the first field in the second storage format by using the updated value of the first field.

The cloud device receives the primary key of the first data object, the updated value of the first field, and the second version number that are sent by the terminal device.

When the cloud device determines that the second version number is the same as the version number in the version number field in the second storage format, the cloud device modifies the value of the first field in the second storage format by using the updated value of the first field.

The cloud device determines a third version number for the first data object. The third version number is different from the first version number and the second version number.

The cloud device sends the third version number and the primary key of the first data object to the terminal device.

The terminal device receives the third version number and the primary key that are sent by the cloud device.

The terminal device changes the version number field in the first storage format corresponding to the primary key from the second version number to the third version number.

After the updated value of the first field that is determined by the terminal device is 24, the terminal device replaces the age 23 in the terminal device with 24, and then sends the primary key 1, the age 24, and the version number 3 to the cloud device. After receiving the data, the cloud device determines the version number in the cloud device based on the primary key 1. Because the version numbers on the terminal side and the cloud side are both 3, no version number conflict exists. The cloud device modifies the age data, replaces 25 with 24, generates a new version number 4, and synchronizes the version number 4 with the terminal device. The terminal device replaces the version number 3 with the version number 4. Finally, the cloud device obtains a result shown in Table 14, and the terminal device obtains a result shown in Table 15.

TABLE 14

Second storage format of a data object "student"

| | First storage field | | | Second storage field | |
|---|---|---|---|---|---|
| | | | Field name | | |
| | Primary key | Name | Gender | Age | Version number (version) | Deleted (deleted) |
| Field value | 1 | Wang Hai | Male | 24 | 4 | False |

TABLE 15

First storage format of a data object "student"

| | First storage field | | | | Second storage field | | |
|---|---|---|---|---|---|---|---|
| | | | Field name | | | | |
| | Primary key | Name | Gender | Age | Ver- sion | changed_ fields_ map | sync_ status | Deleted |
| Field value | 1 | Wang Hai | Male | 24 | 4 | 0000 | 0 | False |

In the update operation process, information in the second storage field is modified in time through version number negotiation and a change in the data synchronization process, to ensure data consistency between the cloud side and the terminal side.

When synchronization is performed between the cloud device and two terminal devices, a conflict resolution may include the following.

The conflict resolution supports a default conflict resolution and a customized conflict resolution. The default conflict resolution is last write win and delete win. Herein, last write win is based on the cloud side. In a case of deletion, deletion is used as a reference, which can be expressed as delete win in English, that is, delete always wins. Herein, delete is used when a conflict exists between last write win and delete win. The customized conflict resolution is notifying the terminal device of conflict data in a callback manner, to resolve the conflict in the terminal device. A conflict resolution during synchronization between two devices may be understood with reference to the following conflict resolution policy explanation table.

3. Deletion Operation:

When the operation for the first data object is the deletion operation, the first storage format of the first data object in the terminal device further includes a deletion indication field. Step 101 may include that the terminal device changes a value of the deletion indication field in the first storage format to a third value in response to the deletion operation of the application for the first data object, to indicate to delete the first data object.

Step 103 may include that the cloud device changes a value of the deletion indication field in the second storage format to a value used to indicate to delete the first data object.

Correspondingly, the synchronization message further includes a deletion operation indication. Step 105 may include that the terminal device deletes the first storage format of the first data object in the terminal device.

When the deletion operation is performed, the cloud device sets the deletion indication field to true. A possible example may be understood with reference to Table 17.

TABLE 16

Understanding of a conflict resolution policy explanation table

| Terminal device 1 | Terminal device 2 | Cloud device | Default policy processing result |
|---|---|---|---|
| Insert insert | Insert | 1. Synchronization is first performed between a terminal device 1 and a cloud side, where a version number on the cloud side changes<br>2. Synchronization is performed between a terminal device 2 and the cloud side | When a default policy Last write win is used, data on the cloud side uses data of the terminal device 1 as a reference, and data of the terminal device 2 is finally a value of the terminal device 1 |
| Update update | Update | 1. Synchronization is first performed between a terminal device 1 and a cloud side, where a version number on the cloud side changes<br>2. Synchronization is performed between a terminal device 2 and the cloud side | When a default policy Last write win is used, data on the cloud side uses data of the terminal device 1 as a reference, and data of the terminal device 2 is finally a value of the terminal device 1 |
| Insert | Insert Update | 1. When a terminal device 2 is offline, synchronization is first performed between a terminal device 1 and a cloud side, where a version number on the cloud side changes<br>2. When the terminal device 2 is online, the terminal device 2 only implements update, and synchronization is performed between the terminal device 2 and the cloud side | When a default policy Last write win is used, data on the cloud side uses data of the terminal device 1 as a reference, and data of the terminal device 2 is finally a value of the terminal device 1 |
| Insert | Delete | 1. Synchronization is first performed between a terminal device 1 and a cloud side, where a version number on the cloud side changes<br>2. Synchronization is performed between a terminal device 2 and the cloud side | When a default policy Delete win is used, data on the cloud side uses data of the terminal device 2 as a reference, and data of the terminal device 1 is finally deleted |
| Update | Delete | 1. Synchronization is first performed between a terminal device 1 and a cloud side, where a version number on the cloud side changes<br>2. Synchronization is performed between a terminal device 2 and the cloud side | When a default policy Delete win is used, data on the cloud side uses data of the terminal device 2 as a reference, and data of the terminal device 1 is finally deleted |
| Delete delete | Delete | 1. Synchronization is first performed between a terminal device 1 and a cloud side, where a version number on the cloud side changes<br>2. Synchronization is performed between a terminal device 2 and the cloud side | When a default policy Delete win is used, data on the cloud side uses data of the terminal device 2 as a reference, and data of the terminal device 1 is finally deleted |

TABLE 17

Second storage format of a data object "student"

| First storage field | | | | Second storage field | |
|---|---|---|---|---|---|
| | | Field name | | | |
| Primary key | Name | Gender | Age | Version number (version) | Deleted (deleted) |
| Field value 1 | Wang Hai | Male | 18 | 2 | True |

In addition, the synchronization response message in step 104 may further include a maximum version number of the data object stored in the cloud device.

Figure 4:
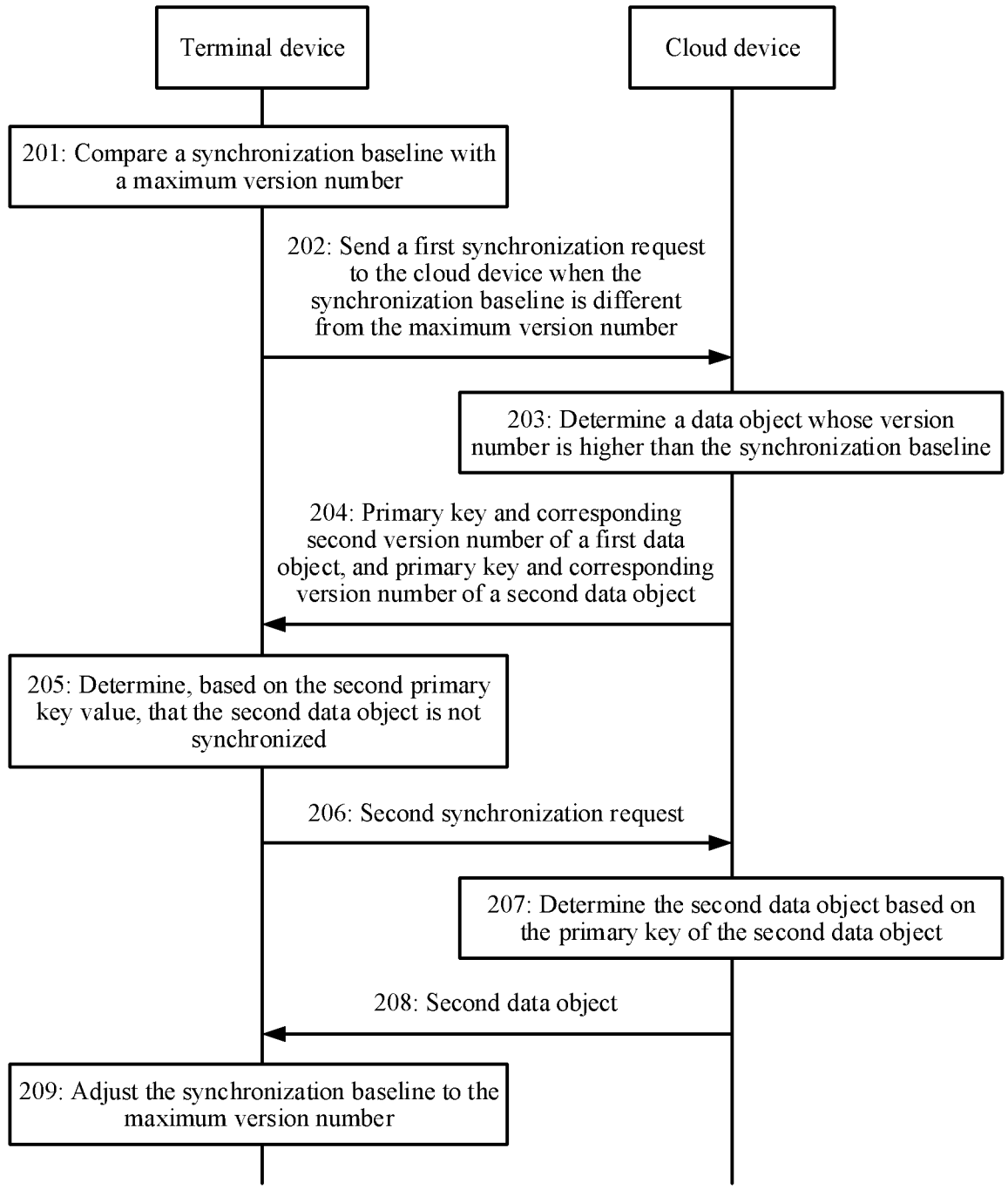
FIG. 4 is a schematic diagram of another embodiment of a data synchronization method according to an embodiment of this disclosure.

When the synchronization response message includes the maximum version number of the data object stored in the cloud device, as shown in FIG. 4, the data synchronization method provided in this embodiment of this disclosure may further include the following steps.

201: The terminal device compares a synchronization baseline with the maximum version number.

The terminal device maintains the synchronization baseline that is used for synchronization with the cloud device. The synchronization baseline indicates a maximum version number of a data object that is modified by the cloud device and that is synchronized to the terminal device. The synchronization baseline is dynamically updated based on a data synchronization status between the terminal device and the cloud device. For example, in an initial state, the synchronization baseline is an initial version number of a data object in the terminal device. After the terminal device and the cloud device complete data synchronization once, the synchronization baseline is a version number of the data object that is currently synchronized with the terminal device. After the terminal device and the cloud device complete data synchronization a plurality of times, the synchronization baseline is a version number that is compared with a synchronization baseline at a previous time. The synchronization baseline may be implemented by using a table. The table includes two fields. One field is a database name field. A type of the field is string. The other field is a watermark field. A type of the field is int. An initial value of the synchronization baseline may be 0.

The data object stored in the cloud device may be understood with reference to an example in Table 18.

TABLE 18

Second storage format of a data object "student"

| First storage field | | | | Second storage field | |
|---|---|---|---|---|---|
| | | Field name | | | |
| Primary key | Name | Gender | Age | Version number (version) | Deleted (deleted) |
| Field value 1 | Wang Hai | Male | 18 | 2 | False |
| Field value 2 | Du Huahua | Female | 20 | 1 | False |

Table 18 is used as an example. If the cloud device stores the data object in Table 18, the maximum version number of the data object stored in the cloud device is 2.

202: The terminal device sends a first synchronization request to the cloud device when the synchronization baseline is different from the maximum version number. Correspondingly, the cloud device receives the first synchronization request sent by the terminal device.

The first synchronization request includes the synchronization baseline.

If the synchronization baseline 0 is different from the maximum version number 2, the terminal device adds the synchronization baseline 0 to the first synchronization request.

203: The cloud device determines a data object whose version number is higher than the synchronization baseline.

The cloud device uses content in Table 18 as a reference. A data object higher than the synchronization baseline 0 has the first data object corresponding to the primary key 1 and the second data object corresponding to the primary key 2.

204: The cloud device sends the primary key and the corresponding second version number of the first data object, and the primary key and a corresponding version number of the second data object to the terminal device. Correspondingly, the terminal device receives the primary key and the corresponding second version number of the first data object that are sent by the cloud device, and the primary key and the corresponding version number of the second data object that are sent by the cloud device.

In the scenario in Table 18, the second version number is 2, the primary key of the second data object is 2, and the version number corresponding to the primary key of the second data object is 1.

205: The terminal device determines, based on the primary key of the second data object, that the second data object is not synchronized.

The terminal device stores the data object corresponding to Table 6. Therefore, the terminal device may determine that information about the second data object (primary key 2, Du Huahua, female, 20 years old) is not stored in the terminal device.

206: The terminal device sends a second synchronization request to the cloud device, and correspondingly, the cloud device receives the second synchronization request sent by the terminal device.

When the version number corresponding to the primary key of the first data object in the terminal device is the same as the second version number, the second synchronization request includes the primary key of the second data object. In this scenario, the second synchronization request includes the primary key 2.

When the version number corresponding to the primary key of the first data object in the terminal device is different from the second version number, the second synchronization request includes the primary key of the second data object and the primary key of the first data object. In this scenario, the second synchronization request includes the primary key 2 and the primary key 1.

207: The terminal device determines the second data object based on the primary key of the second data object.

The cloud device may determine the second data object (primary key 2, Du Huahua, female, 20 years old) based on the primary key 2.

When the version number corresponding to the primary key of the first data object in the terminal device is different from the second version number, the cloud device determines the second data object based on the primary key of the second data object, and determines the value of the first field in the second storage format of the first data object based on the primary key of the first data object.

208: The cloud device sends the second data object to the terminal device, and correspondingly, the terminal device receives the second data object.

After the second data object is synchronized, the terminal device obtains content in an example in Table 19.

TABLE 19

First storage format of a data object "student"

| | First storage field | | | | Second storage field | | |
|---|---|---|---|---|---|---|---|
| | Field name | | | | | | |
| | Primary key | Name | Gender | Age | Version | changed_ fields_map | sync_ status | Deleted |
| Field value | 1 | Wang Hai | Male | 18 | 2 | 0000 | 0 | False |
| Field value | 2 | Du Huahua | Female | 20 | 1 | 0000 | 0 | False |

When the version number corresponding to the primary key of the first data object in the terminal device is different from the second version number, the cloud device sends the value of the first field in the second storage format of the second data object and the value of the first field in the second storage format of the first data object to the terminal device.

209: The terminal device adjusts the synchronization baseline to the maximum version number.

After the synchronization ends, the terminal device adjusts the synchronization baseline from 0 to 2.

In this embodiment, the terminal device adjusts the synchronization baseline to the maximum version number in time, for example, adjusts the synchronization baseline from 0 to 2. In this way, the cloud device repeatedly requesting the stored data object after sending the latest maximum version number can be avoided.

In addition, in this embodiment of this disclosure, before the synchronization, the terminal device performs application version negotiation with the cloud device. The terminal device sends version information of the application to the cloud device. The cloud device receives the version information of the application that is sent by the terminal device. The cloud device determines the first storage format of the first data object in the terminal device based on the version information of the application.

Figure 5:
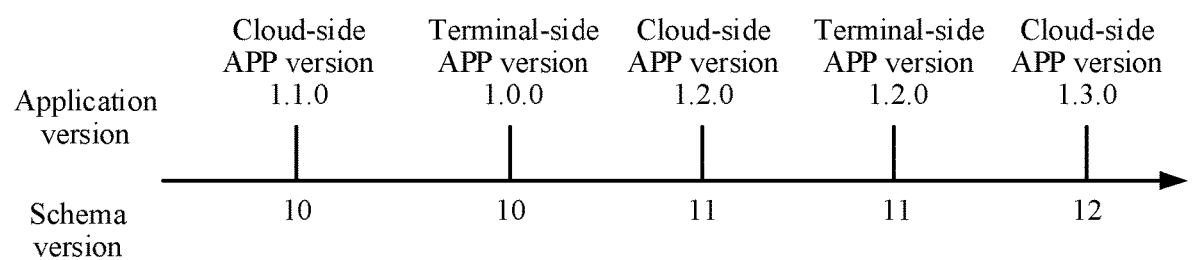
FIG. 5 is a schematic diagram of a version evolution process according to an embodiment of this disclosure.

It should be noted that a version of the first storage format in the terminal device and a version of the second storage format in the cloud device need to evolve based on the same history. An evolution process may be understood with reference to FIG. 5. The first storage format of the terminal device needs to be first created and upgraded in the cloud device. A storage format may also be referred to as a Schema. Each application version corresponds to a Schema version. Therefore, a Schema version to be used may be determined through application version negotiation, that is, a version of a storage format to be used. Field information in a first storage field and a second storage field that are included in storage formats in different versions are different.

For ease of understanding, the following describes a data synchronization process provided in an embodiment of this disclosure by using a scenario in which the application is an address book as an example.

In this address book scenario, for example, the terminal device is a mobile phone, and the cloud device is a server. The user creates a new contact by using the address book. The new contact is recorded as a data object. When the data object is created, a primary key is allocated for the data object. In this scenario, if an operation for the address book to which the mobile phone responds is an insertion operation, a primary key is allocated for the new contact, for example, a primary key 1. Attribute information of the inserted first field may be, for example, Last name: Wang, First name: Hai, Company: A trading company, Phone number: 13156004789. In this scenario, the primary key 1 and the attribute information of the inserted first field are stored in the primary key field and the first field in the first storage format, that is, in the first storage field in the foregoing table. The first storage format further includes a second storage field. For related explanations of the first storage format, the first storage field, and the second storage field, refer to the description in the foregoing embodiments for understanding. A storage form of the inserted new contact in the mobile phone in the scenario may be understood with reference to the example of the insertion operation in the related table in the foregoing embodiments. The mobile phone sends a synchronization message to the server. The synchronization message includes the primary key 1, Wang, Hai, A trading company, 13156004789, a version number 0, and an insertion operation indication. After receiving the synchronization message, the server fills the first storage field in the second storage format with the foregoing information, and generates a new version number, for example, a version number 1. The server fills the version number field in the second storage field with the version number 1, and fills the deletion indication field in the second storage field with non-deletion indication based on the insertion operation indication, for example, false. Then, the server sends a synchronization response message to the mobile phone. The synchronization response message includes the primary key 1 and the version number 1. The mobile phone changes the version number of the data object from 0 to 1, and modifies, for example, fields: changed_fields_map and sync_status in Table 3.

Still with reference to the address book scenario, when the user needs to modify the contact record of Wang Hai, the mobile phone responds to the update operation, for example, changes A trading company to B trading company and changes the phone number to 13200005689. In this scenario, the mobile phone changes a company field and a phone number field in the first field in the first storage format of the data object: Wang Hai to the updated values. For an operation process of a modification operation in the mobile phone, refer to the related example of the update operation in the foregoing embodiment for understanding. A synchronization message sent by the mobile phone to the server includes a primary key 1, B trading company, 13200005689, and a version number 1. After receiving the synchronization message, the server finds the data object: Wang Hai by using the primary key 1, and then respectively changes information of the company field and the phone number field in the first storage field of the data object to B trading company and 13200005689. The server further generates a new version number for the data object, for example, a version number 2. Then, the server sends a synchronization response message to the mobile phone. The synchronization response message includes the primary key 1 and the version number 2. After the mobile phone finds the data object: Wang Hai by using the primary key 1, the mobile phone changes the version number 1 to the version number 2, and modifies, for example, fields: changed_fields_map and sync_status in Table 9.

Still with reference to the address book scenario, when the user needs to delete the contact record of Wang Hai, the mobile phone responds to the deletion operation, for example, changes a deleted field in the first storage format of the data object in the mobile phone to false. Then, the mobile phone sends a synchronization message to the server. The synchronization message includes the primary key 1 and the deletion operation indication. The server finds the data object: Wang Hai by using the primary key 1, and then changes the deleted field in the second storage format of the data object: Wang Hai to false. The server sends a synchronization response message to the mobile phone. The synchronization response message includes the primary key 1. The mobile phone finds the data object: Wang Hai by using the primary key 1, and deletes the data object.

Figure 6:
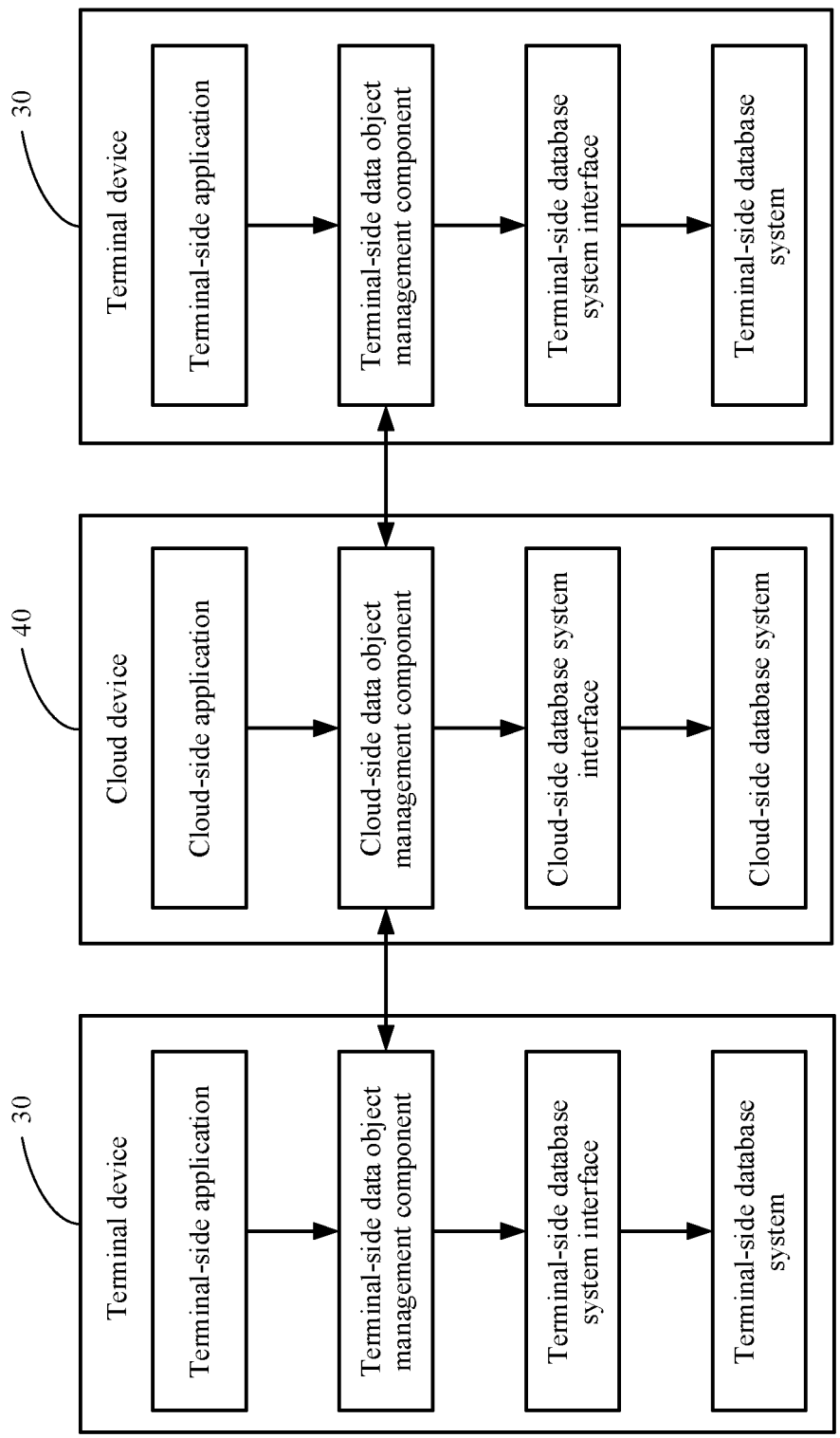
FIG. 6 is a schematic diagram of software architecture of a data synchronization system according to an embodiment of this disclosure.

For software architecture, the architecture of the data synchronization system may also be understood with reference to FIG. 6.

As shown in FIG. 6, software architecture of a terminal device 30 includes a terminal-side application, a terminal-side data object management component, a terminal-side database system interface, and a terminal-side database system. Software architecture of a cloud device 40 includes a cloud-side application, a cloud-side data object management component, a cloud-side database system interface, and a cloud-side database system.

The terminal-side application interacts with the terminal-side data object management component. The terminal-side data object management component may interact with the terminal-side database system through the terminal-side database system interface. The cloud-side application interacts with the cloud-side data object management component. The cloud-side data object management component may interact with the cloud-side database system through the cloud-side database system interface. Communication between the terminal-side data object management component and the cloud-side data object management component may implement interaction between a terminal side and a cloud side.

The terminal-side data object management component is used by an application in an embedded component manner. The cloud-side data object management component is used by an application in a client/server manner. Operations and functions of the terminal device described in the method embodiments may be implemented by the terminal-side data object management component. Operations and functions of the cloud device described in the method embodiments may be implemented by the cloud-side data object management component. The terminal-side data object management component and the cloud-side data object management component may be both implemented by software. Processors in the terminal device and the cloud device implement corresponding functions through running software.

Figure 7A:
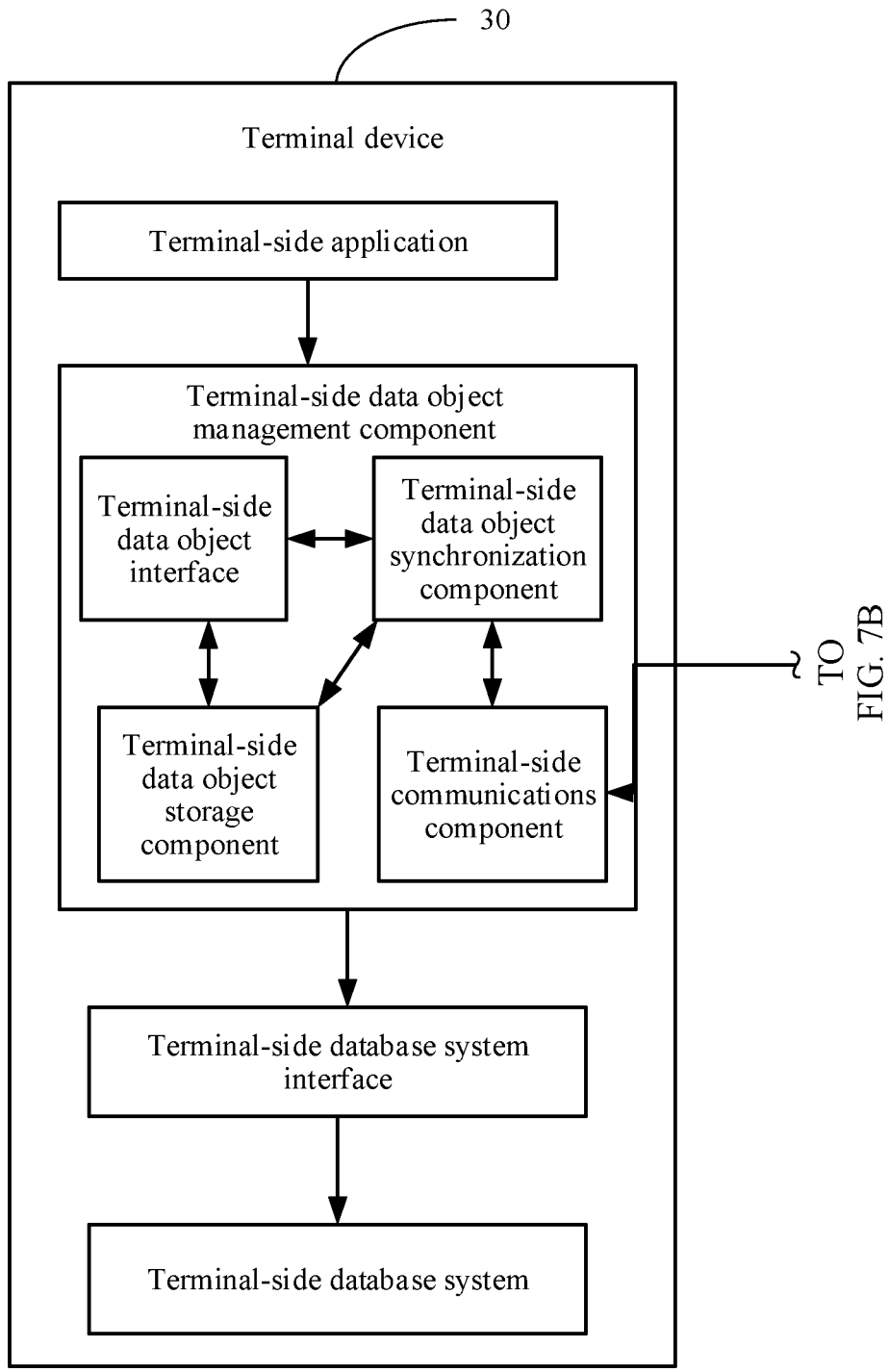
FIG. 7A, FIG. 7B, and FIG. 7C are a schematic diagram of another software architecture of a data synchronization system according to an embodiment of this disclosure.
Figure 7B:
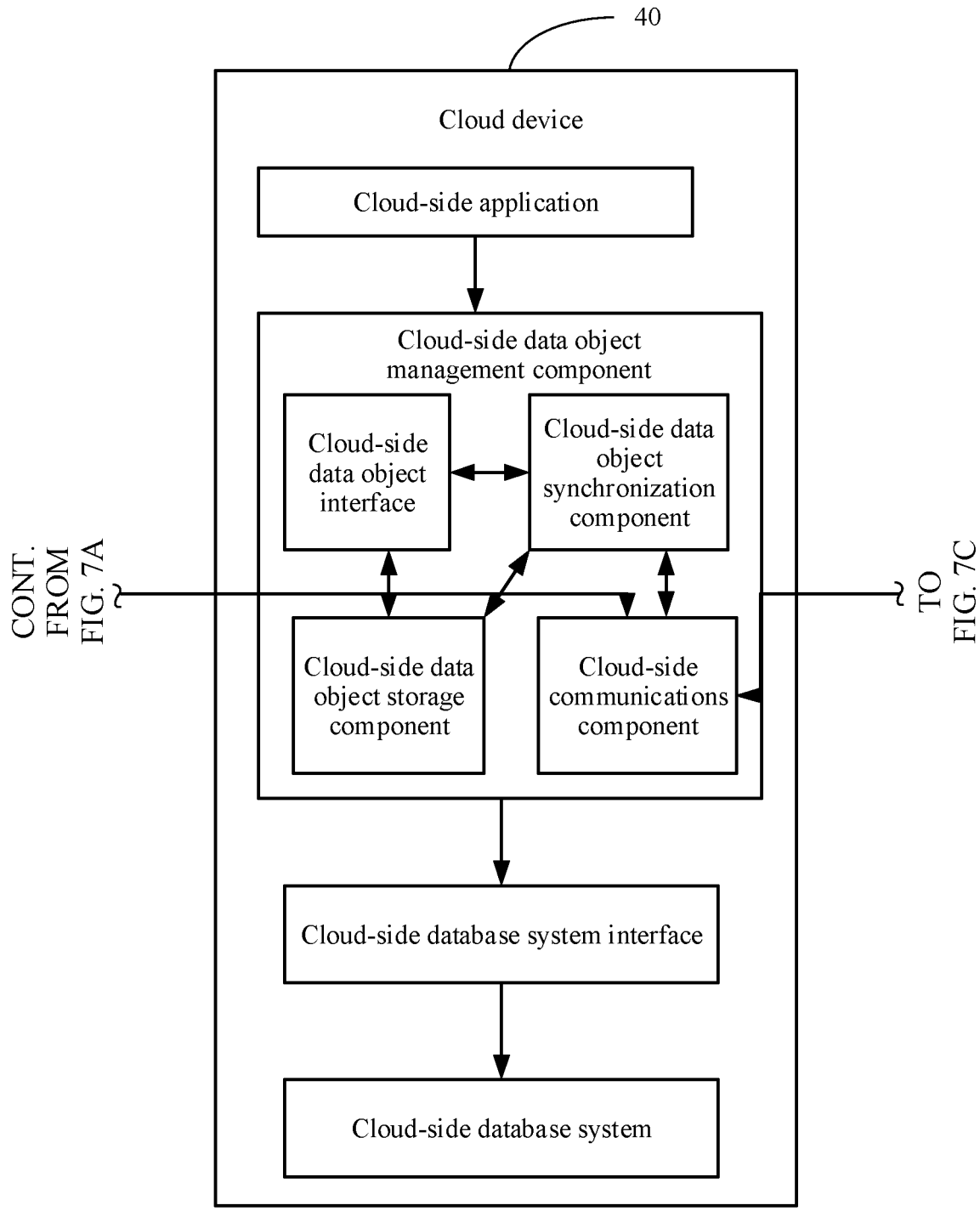
Figure 7C:
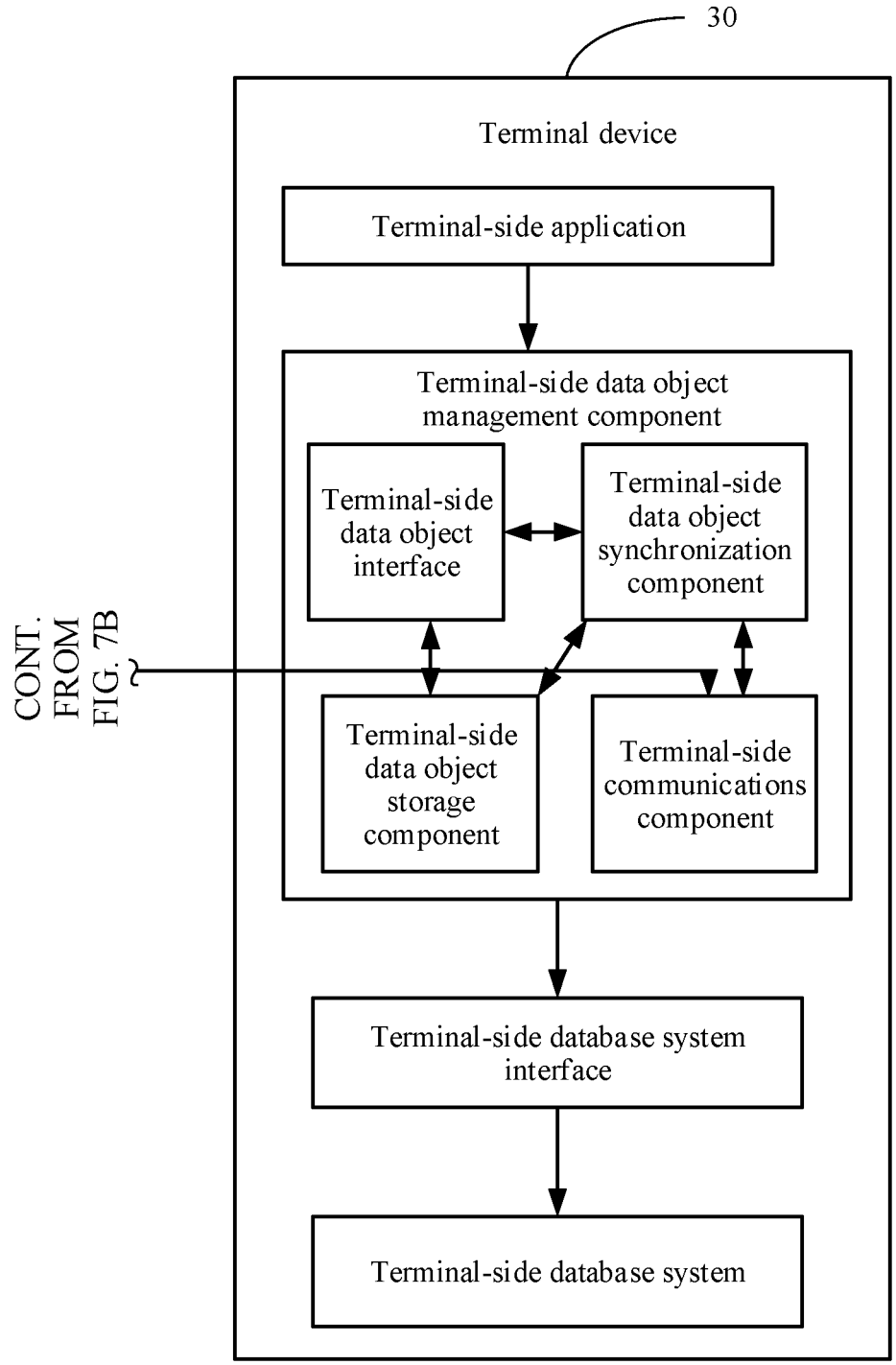

FIG. 7A, FIG. 7B, and FIG. 7C show a function division manner of a terminal-side data object management component and a cloud-side data object management component. As shown in FIG. 7A, FIG. 7B, and FIG. 7C, the terminal-side data object management component may include a terminal-side data object interface, a terminal-side data object storage component, a terminal-side data object synchronization component, and a terminal-side communication component. The cloud-side data object management component may include a cloud-side data object interface, a cloud-side data object storage component, a cloud-side data object synchronization component, and a cloud-side communication component.

The terminal-side data object interface is an interface of the terminal-side data object management component. A terminal-side application operates a data object by using this interface. The terminal-side data object interface includes a data object definition interface, a data object addition interface, a data object modification interface, a data object deletion interface, and a data object query interface.

The terminal-side data object storage component is responsible for mapping from an object model to a storage model, and converting an operation for an object to an operation for a bottom-layer database system.

The terminal-side data object synchronization component is responsible for tracking a change of terminal-side data. The terminal-side data object synchronization component includes a data synchronization status component, a synchronization location component, and a terminal-side conflict callback resolution.

The terminal-side communication component is responsible for establishing a communication channel between the cloud side and the terminal side, and implementing data transmission between the terminal side and the cloud side.

The cloud-side data object interface is an interface of the cloud-side data object management component. A cloud-side application operates a data object by using this interface. The cloud-side data object interface includes a data object definition interface, a data object addition interface, a data object modification interface, a data object deletion interface, and a data object query interface.

The cloud-side data object storage component is responsible for mapping from a cloud-side object model to a storage model, and converting an operation for an object to an operation for a bottom-layer database system.

The cloud-side data object synchronization component is responsible for a conflict resolution between a version component of the cloud-side data and the cloud side.

The cloud-side communication component is responsible for monitoring a connection on the terminal side, and implementing data transmission between the terminal side and the cloud side.

The foregoing describes the data synchronization system and the data synchronization method. With reference to the accompanying drawings, the following describes the terminal device and the cloud device that are provided in the embodiments of this disclosure.

Figure 8:
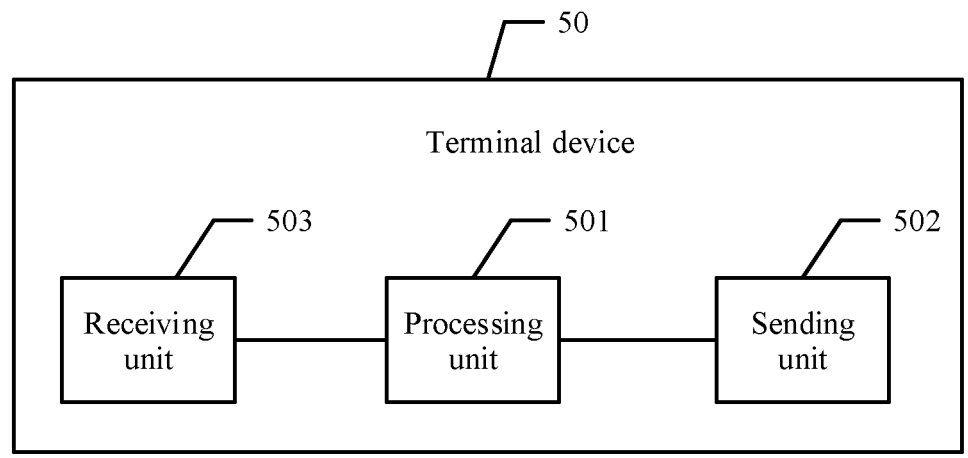
FIG. 8 is a schematic diagram of an embodiment of a terminal device according to an embodiment of this disclosure.

As shown in FIG. 8, an embodiment of a terminal device 50 according to an embodiment of this disclosure may include a processing unit 501 configured to modify a first storage format of a first data object in the terminal device in response to an operation of an application for the first data object, where the first storage format includes a primary key field used to store a primary key for uniquely identifying the first data object, a first field used to store an attribute for describing the first data object, a version number field used to store a version number of the first data object, and a synchronization status field, a sending unit 502 configured to send a synchronization message to a cloud device, where the synchronization message includes the primary key of the first data object, and a receiving unit 503 configured to receive a synchronization response message that is sent by the cloud device after the cloud device modifies a second storage format of the first data object in the cloud device based on the synchronization message, where the synchronization response message includes the primary key.

The processing unit 501 is further configured to perform a modification operation on the first storage format of the first data object in the terminal device in response to the synchronization response message.

In the solution provided in this embodiment of this disclosure, when a data object changes, the terminal device and the cloud device may ensure consistency in data synchronization between heterogeneous databases by using version number management and synchronization status management.

In a possible embodiment, the operation is an insert operation.

The processing unit 501 is configured to, in response to the insertion operation of the application for the first data object, fill the primary key field and the first field in the first storage format with a primary key and attribute information of the first data object included in the insertion operation, change a value of the version number field in the first storage format to a first version number, and change a value of the synchronization status field in the first storage format to a first value, to indicate that the first storage format is in a to-be-synchronized state.

Correspondingly, the synchronization response message further includes a second version number, and the processing unit 501 is configured to change the value of the version number field in the first storage format from the first version number to the second version number, and change the value of the synchronization status field to a second value, to indicate that the first storage format is in a synchronized state.

In a possible embodiment, the operation is an update operation, and the processing unit 501 is configured to update a value of the first field in the first storage format in response to the update operation of the application for the first data object, change a value of the version number field in the first storage format to a first version number, and change a value of the synchronization status field in the first storage format to a first value, to indicate that the first storage format is in a to-be-synchronized state.

Correspondingly, the synchronization response message further includes a second version number, and the processing unit 501 is configured to change the version number field in the first storage format from the first version number to the second version number, and change the value of the synchronization status field in the first storage format to a second value, to indicate that the first storage format is in a synchronized state.

In a possible embodiment, the synchronization response message further includes a value of a first field in the second storage format, and the processing unit 501 is further configured to update the value of the first field in the first storage format based on the value of the first field in the second storage format.

In a possible embodiment, the synchronization response message further includes a value of a first field in the second storage format.

The processing unit 501 is further configured to determine an updated value of the first field based on the value of the first field in the first storage format and the value of the first field in the second storage format, and modify the value of the first field in the first storage format by using the updated value of the first field.

The sending unit 502 is further configured to send the primary key, the updated value of the first field, and the second version number to the cloud device, so that the cloud device modifies the value of the first field in the second storage format by using the updated value of the first field.

The receiving unit 503 is further configured to receive a third version number and the primary key that are sent by the cloud device.

The processing unit 501 is further configured to change the version number field in the first storage format corresponding to the primary key from the second version number to the third version number.

In a possible embodiment, the operation is a deletion operation, and the first storage format of the first data object in the terminal device further includes a deletion indication field.

The processing unit 501 is configured to change a value of the deletion indication field in the first storage format to a third value in response to the deletion operation of the application for the first data object, to indicate to delete the first data object.

Correspondingly, the synchronization message further includes a deletion operation indication, and the processing unit 501 is configured to delete the first storage format of the first data object in the terminal device.

In a possible embodiment, the synchronization response message further includes a maximum version number of a data object stored in the cloud device.

The processing unit 501 is further configured to compare a synchronization baseline with the maximum version number, where the synchronization baseline is an initial version number of the data object in the terminal device or a version number that is compared with a synchronization baseline at a previous time.

The sending unit 502 is further configured to send a first synchronization request to the cloud device when the synchronization baseline is different from the maximum version number, where the first synchronization request includes the synchronization baseline.

The receiving unit 503 is further configured to receive the primary key and the corresponding second version number of the first data object that are sent by the cloud device, and a primary key and a corresponding version number of a second data object that are sent by the cloud device.

The processing unit 501 is further configured to determine, based on the primary key of the second data object, that the second data object is not synchronized.

The sending unit 502 is further configured to send a second synchronization request to the cloud device when a version number corresponding to the primary key of the first data object in the terminal device is the same as the second version number, where the second synchronization request includes the primary key of the second data object, or send a second synchronization request to the cloud device when a version number corresponding to the primary key of the first data object in the terminal device is different from the second version number, where the second synchronization request includes the primary key of the second data object and the primary key of the first data object.

The receiving unit 503 is further configured to receive the second data object when a version number corresponding to the primary key of the first data object in the terminal device is the same as the second version number, or receive the second data object and the value of the first field in the second storage format when a version number corresponding to the primary key of the first data object in the terminal device is different from the second version number.

The processing unit 501 is further configured to adjust the synchronization baseline to the maximum version number.

In a possible embodiment, the sending unit 502 is further configured to send version information of the application to the cloud device, where the version information of the application is used by the cloud device to determine the first storage format of the first data object in the terminal device.

It should be noted that content such as information exchange between the modules of the terminal device 50 and the execution processes thereof is based on a same concept as the method embodiments of this disclosure, and achieves same technical effects as the method embodiments of the present disclosure. For specific content, refer to the foregoing descriptions in the method embodiments of this disclosure. Details are not described herein again.

Figure 9:
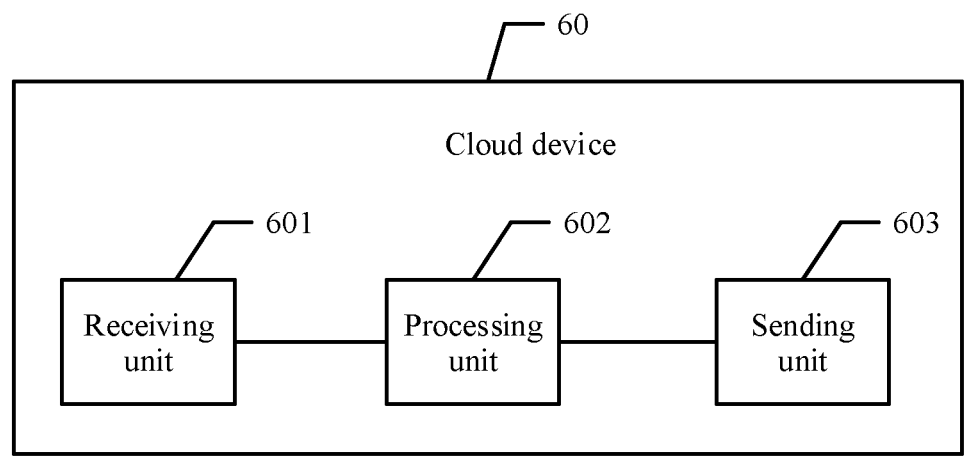
FIG. 9 is a schematic diagram of an embodiment of a cloud device according to an embodiment of this disclosure.

As shown in FIG. 9, an embodiment of a cloud device 60 according to an embodiment of this disclosure may include a receiving unit 601 configured to receive a synchronization message sent by a terminal device, where the synchronization message includes a primary key of a first data object, and the first data object is stored in a first storage format in the terminal device. a processing unit 602 configured to modify a second storage format of the first data object in the cloud device based on the synchronization message, where the second storage format includes a primary key field used to store a primary key for uniquely identifying the first data object, a first field used to store an attribute for describing the first data object, and a version number field used to store a version number of the first data object. a sending unit 603 configured to send a synchronization response message to the terminal device, where the synchronization response message includes the primary key, and the synchronization response message is used by the terminal device to perform a modification operation on the first storage format of the first data object in the terminal device.

In the solution provided in this embodiment of this disclosure, when a data object changes, the terminal device and the cloud device may ensure consistency in data synchronization between heterogeneous databases by using version number management and synchronization status management.

In a possible embodiment, the synchronization message further includes attribute information of the first data object, and the processing unit 602 is configured to separately fill the primary key field and the first field in the second storage format with the primary key and the attribute information of the first data object based on the synchronization message, and determine a second version number for the first data object, and fill the version number field in the second storage format with the second version number.

In a possible embodiment, the synchronization message further includes a first version number and attribute information of the first data object, and the processing unit 602 is configured to determine a version number in the version number field in the second storage format based on the primary key of the first data object, update the first field in the second storage format by using the attribute information of the first data object when the first version number is the same as the version number in the version number field in the second storage format, and determine a second version number for the first data object, and update the version number field in the second storage format by using the second version number.

In a possible embodiment, the processing unit 602 is further configured to add a value of the first field in the second storage format to the synchronization response message when the first version number is different from the version number in the version number field in the second storage format.

In a possible embodiment, the processing unit 602 is further configured to add a value of the first field in the second storage format to the synchronization response message when the first version number is different from the version number in the version number field in the second storage format.

The receiving unit 601 is further configured to receive the primary key of the first data object, an updated value of the first field, and the second version number that are sent by the terminal device.

The processing unit 602 is further configured to modify the value of the first field in the second storage format by using the updated value of the first field when the second version number is the same as the version number in the version number field in the second storage format, and determine a third version number for the first data object, where the third version number is different from the first version number and the second version number.

The sending unit 603 is further configured to send the third version number and the primary key of the first data object to the terminal device, so that the terminal device changes the version number field in the first storage format corresponding to the primary key from the second version number to the third version number.

In a possible embodiment, the second storage format of the first data object in the cloud device further includes a deletion indication field, and the synchronization message further includes a deletion operation indication.

The processing unit 602 is configured to change a value of the deletion indication field in the second storage format to a value used to indicate to delete the first data object.

In a possible embodiment, the synchronization response message further includes a maximum version number of a data object stored in the cloud device.

The receiving unit 601 is further configured to receive a first synchronization request sent by the terminal device, where the first synchronization request includes a synchronization baseline maintained in the terminal device, and the synchronization baseline is an initial version number of the data object in the terminal device or a version number that is compared with a synchronization baseline in the terminal device at a previous time.

The processing unit 602 is further configured to determine a data object whose version number is higher than the synchronization baseline.

The sending unit 603 is further configured to send the primary key and the corresponding second version number of the first data object, and a primary key and a corresponding version number of a second data object to the terminal device.

The receiving unit 601 is further configured to receive a second synchronization request sent by the terminal device, where the second synchronization request includes the primary key of the second data object, or the second synchronization request includes the primary key of the second data object and the primary key of the first data object.

The processing unit 602 is further configured to determine the second data object based on the primary key of the second data object, or determine the second data object based on the primary key of the second data object, and determine the first data object based on the primary key of the first data object.

The sending unit 603 is further configured to send the second data object, or the second data object and the value of the first field in the second storage format to the terminal device.

In a possible embodiment, the receiving unit 601 is further configured to receive version information that is of an application and that is sent by the terminal device.

The processing unit 602 is further configured to determine the first storage format of the first data object in the terminal device according to the version information of the application.

It should be noted that content such as information exchange between the modules of the cloud device 60 and the execution processes thereof is based on a same concept as the method embodiments of this disclosure, and achieves same technical effects as the method embodiments of the present disclosure. For specific content, refer to the foregoing descriptions in the method embodiments of this disclosure. Details are not described herein again.

Figure 10:
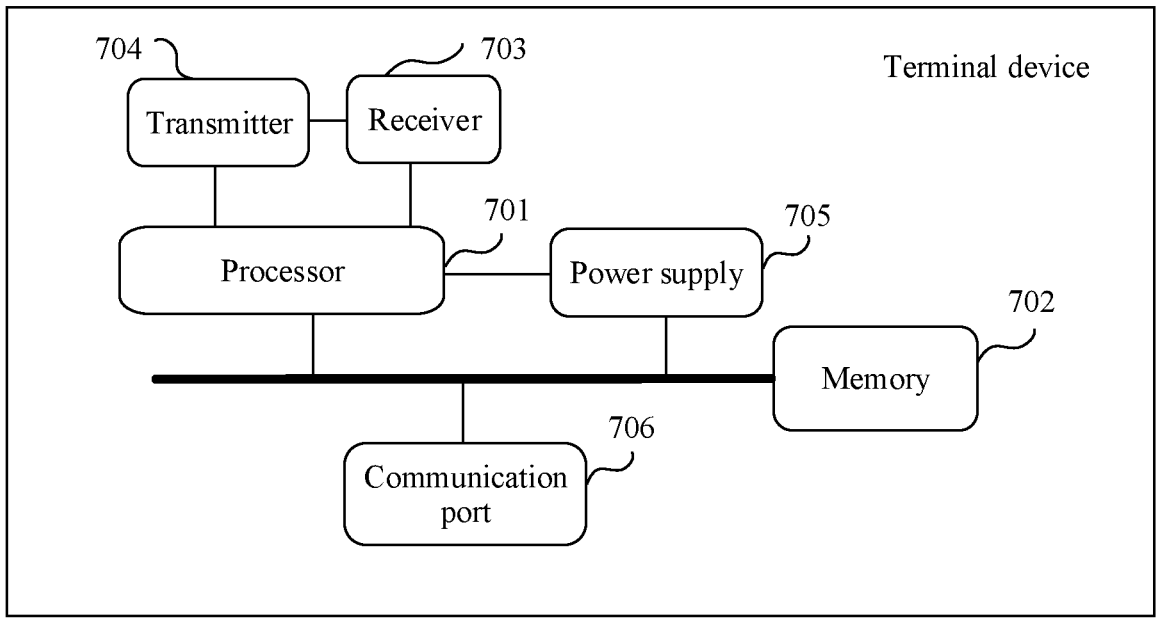
FIG. 10 is a schematic diagram of another embodiment of a terminal device according to an embodiment of this disclosure.

FIG. 10 is a schematic diagram depicting a structure of another device according to an embodiment of this disclosure. The device is a terminal device. The terminal device may include a processor 701 (for example, a central processing unit (CPU)), a memory 702, a transmitter 704, and a receiver 703. The transmitter 704 and the receiver 703 are coupled to the processor 701. The processor 701 controls a sending action of the transmitter 704 and a receiving action of the receiver 703. The memory 702 may include a high-speed random-access memory (RAM), or may include a non-volatile memory (NVM), for example, at least one magnetic disk memory. The memory 702 may store various instructions, to implement various processing functions and implement method steps in embodiments of this disclosure. Optionally, the terminal device in this embodiment of this disclosure may further include one or more of a power supply 705 and a communication port 706. The components described in FIG. 10 may be connected via a communication bus, or may be connected in another connection manner. This is not limited in this embodiment of this disclosure. The receiver 703 and the transmitter 704 may be integrated into a transceiver of the terminal device, or may be a receive antenna and a transmit antenna that are independent of each other on the terminal device. The communication bus is configured to implement communication connection between components. The communication port 706 is configured to implement connection and communication between the terminal device and another peripheral.

In some embodiments, the processor 701 in the terminal device may perform an action performed by the processing unit 501 in FIG. 8, the receiver 703 in the terminal device may perform an action performed by the receiving unit 503 in FIG. 8, and the transmitter 704 in the terminal device may perform an action performed by the sending unit 502 in FIG. 8. Implementation principles and technical effects thereof are similar, and details are not described herein again.

This disclosure further provides a chip system. The chip system includes a processor configured to support the foregoing terminal device in implementing functions related to the terminal device, for example, receiving or processing data in the foregoing method embodiments. In a possible design, the chip system further includes a memory. The memory is configured to store program instructions and data that are necessary for the terminal device. The chip system may include a chip, or may include a chip and another discrete component.

Figure 11:
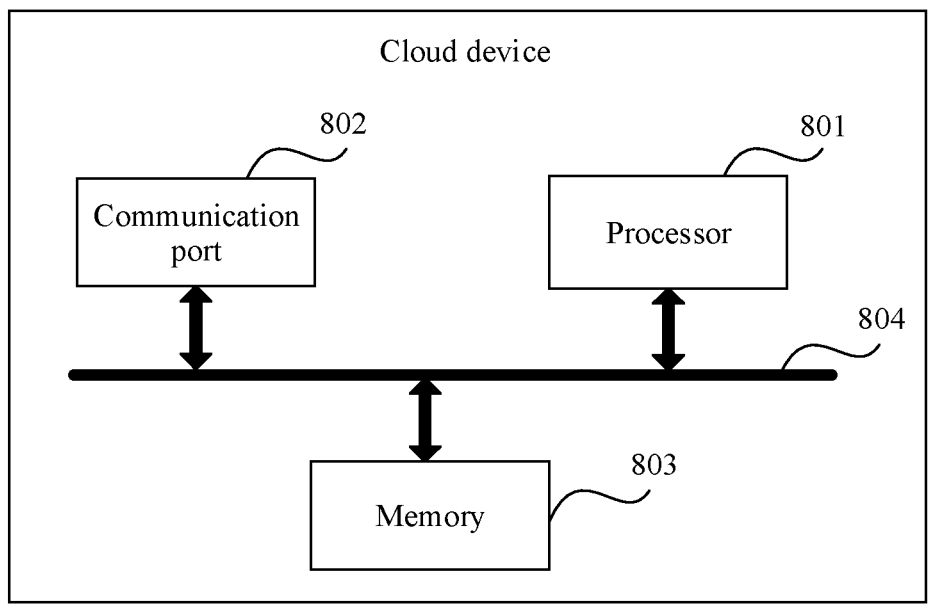
FIG. 11 is a schematic diagram of another embodiment of a cloud device according to an embodiment of this disclosure.

FIG. 11 is a schematic diagram of a possible logical structure of a cloud device 80 in the foregoing embodiments according to an embodiment of this disclosure. The cloud device 80 includes a processor 801, a communication port 802, a memory 803, and a bus 804. The processor 801, the communication port 802, and the memory 803 are connected to each other by using the bus 804. In this embodiment of this disclosure, the processor 801 is configured to control and manage an action of the cloud device 80. For example, the processor 801 is configured to perform functions performed by the processing unit 602 in FIG. 9. The communication port 802 is configured to support the cloud device 80 in communication, and may perform functions performed by the receiving unit 601 and the sending unit 603 in FIG. 9. The memory 803 is configured to store program code and data of the cloud device 80.

The processor 801 may be a central processing unit, a general-purpose processor, a digital signal processor, an application-specific integrated circuit, a field programmable gate array or another programmable logic device, a transistor logic device, a hardware component, or any combination thereof. The processor 801 may implement or execute logical blocks, modules, and circuits in various examples described with reference to content disclosed in this disclosure. Alternatively, the processor may be a combination for implementing a computing function, for example, a combination including one or more microprocessors, or a combination of a digital signal processor and a microprocessor. The bus 804 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 11, but this does not mean that there is only one bus or only one type of bus.

This disclosure further provides a chip system. The chip system includes a processor configured to support the foregoing cloud device in implementing functions related to the cloud device, for example, receiving or processing data in the foregoing method embodiments. In a possible design, the chip system further includes a memory. The memory is configured to store program instructions and data that are necessary for the terminal device. The chip system may include a chip, or may include a chip and another discrete component.

In another embodiment of this disclosure, a computer-readable storage medium is further provided. The computer-readable storage medium stores computer-executable instructions. When at least one processor of a device executes the computer-executable instructions, the device performs the methods described in the embodiments in FIG. 3 to FIG. 7A, FIG. 7B, and FIG. 7C.

In another embodiment of this disclosure, a computer program product is further provided. The computer program product includes computer-executable instructions, and the computer-executable instructions are stored in a computer-readable storage medium. At least one processor of a device may read the computer-executable instructions from the computer-readable storage medium. When the at least one processor executes the computer-executable instructions, the device is enabled to perform the methods described in the embodiments in FIG. 3 to FIG. 7A, FIG. 7B, and FIG. 7C.

A person of ordinary skill in the art may be aware that, in combination with the units and algorithm steps in the examples described in embodiments disclosed in this specification, this disclosure can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of embodiments of this disclosure.

It may be clearly understood by a person skilled in the art that, for the purpose of convenient and brief description, for a detailed working process of the foregoing system, apparatus, and unit, reference may be made to a corresponding process in the foregoing method embodiment. Details are not described herein again.

In the several embodiments provided in this disclosure, it should be understood that the disclosed system, apparatus and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, functional units in embodiments of this disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the conventional technologies, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this disclosure. The foregoing storage medium includes any medium that can store program code, such as a Universal Serial Bus (USB) flash drive, a removable hard disk, a read-only memory (ROM), a RAM, a magnetic disk, or an optical disc.

The foregoing descriptions are merely specific implementations of embodiments of this disclosure, but are not intended to limit the protection scope of embodiments of this disclosure. Any variation or replacement readily figured out by a person skilled in the art within the technical scope disclosed in embodiments of this disclosure shall fall within the protection scope of embodiments of this disclosure. Therefore, the protection scope of embodiments of this disclosure shall be subject to the protection scope of the claims.

What is claimed is:

1. A method comprising:
sending, to a cloud device, version information of an application, wherein the version information enables the cloud device to determine a first data record that is of a first data object and that is in a terminal device;
modifying, in response to a first operation of the application for the first data object, the first data record that comprises a primary key field for storing a primary key for uniquely identifying the first data object, a first field for storing an attribute for describing the first data object, a version number field for storing a first version number of the first data object, and a synchronization status field;
sending, to the cloud device, a synchronization message comprising the primary key;
receiving, from the cloud device, a synchronization response message that comprises the primary key and that is based on a second data record that is in the cloud device, that corresponds to the first data object, and that is based on the synchronization message; and
performing, in response to the synchronization response message, a modification operation on the first data record.

2. The method of claim 1, wherein the synchronization response message further comprises a third version number, wherein the first operation is an insertion operation comprising attribute information, and wherein the method further comprises:
obtaining the insertion operation;
filling, in response to obtaining the insertion operation, the primary key field with the primary key;
filling, in response to obtaining the insertion operation, the first field with the attribute information;
changing a first value of the version number field to a second version number;
changing a second value of the synchronization status field to a third value to indicate that the first data record is in a to-be-synchronized state;
changing the first value from the second version number to the third version number based on the synchronization response message; and
changing the second value to a fourth value to indicate that the first data record is in a synchronized state.

3. The method of claim 1, wherein the synchronization response message further comprises a third version number, wherein the first operation is an update operation, and wherein the method further comprises:
obtaining the update operation;
updating, in response to obtaining the update operation, a first value of the first field;
changing a second value of the version number field-to a second version number;
changing a third value of the synchronization status field to a fourth value to indicate that the first data record is in a to-be-synchronized state;
changing the version number field from the second version number to the third version number based on the synchronization response message; and
changing the third value to a fifth value to indicate that the first data record is in a synchronized state.

4. The method of claim 3, wherein the synchronization response message further comprises a sixth value of a second first field in the second data record, and wherein the method further comprises updating, based on the sixth value, the first value.

5. The method of claim 3, wherein the synchronization response message further comprises a sixth value of a second first field in the second data record, and wherein the method further comprises:
   determining, based on the first value and the sixth value, an updated value of the first field;
   modifying, using the updated value, the first value;
   sending, to the cloud device, the primary key, the updated value, and the third version number to enable the cloud device to modify the sixth value using the updated value;
   receiving, from the cloud device, a fourth version number and the primary key; and
   changing the second value from the third version number to the fourth version number.

6. The method of claim 1, wherein the first operation is a deletion operation, wherein the first data record further comprises a deletion indication field, and wherein the method further comprises:
   obtaining the deletion operation;
   changing, in response to obtaining the deletion operation, a first value of the deletion indication field to a second value to indicate to delete the first data object; and
   deleting the first data record.

7. The method of claim 1, wherein the application comprises an address book application, a gallery application, or an instant application.

8. A method implemented by a cloud device, wherein the method comprises:
   receiving, from a terminal device, version information of an application;
   determining, based on the version information, a first data record that is of a first data object and that is in the terminal device;
   receiving, from the terminal device, a synchronization message comprising a primary key of the first data object, wherein the primary key uniquely identifies the first data object;
   modifying, based on the synchronization message, a second data record that corresponds to the first data object, that is in the cloud device and that comprises a primary key field used to store the primary key, a first field for storing an attribute describing the first data object, and a version number field for storing a first version number of the first data object; and
   sending, to the terminal device, a synchronization response message comprising the primary key to enable the terminal device to perform a modification operation on the first data record.

9. The method of claim 8, wherein the synchronization message further comprises attribute information of the first data object, and wherein the method further comprises:
   filling, based on the synchronization message, the primary key field with the primary key;
   filling, based on the synchronization message, the first field with the attribute information;
   determining a second version number for the first data object; and
   filling the version number field with the second version number.

10. The method of claim 8, wherein the synchronization message further comprises a second version number for the first data object and attribute information of the first data object, and wherein the method further comprises:
   determining, based on the primary key, the first version number in the version number field;
   updating the first field using the attribute information when the first version number is the same as the second version number;
   determining a third version number for the first data object; and
   updating, using the third version number, the version number field.

11. The method of claim 10, further comprising:
   identifying that the first version number is different from the second version number; and
   adding, in response to the identifying, a value of the first field to the synchronization response message.

12. The method of claim 10, further comprising:
   identifying that the first version number is different from the second version number;
   adding, in response to the identifying, a first value of the first field to the synchronization response message;
   receiving, from the terminal device, the primary key, an updated value of the first field, and a fourth version number;
   determining that the fourth version number is the same as the third version number;
   modifying, using the updated value, the first value;
   determining a fifth version number for the first data object, wherein the fifth version number is different from the second version number and the third version number; and
   sending, to the terminal device, the fifth version number and the primary key to enable the terminal device to change a second version number field in the first data record from the fourth version number to the fifth version number.

13. The method of claim 8, wherein the second data record further comprises a deletion indication field, wherein the synchronization message further comprises a deletion operation indication, and wherein the method further comprises changing a first value of the deletion indication field to a second value to indicate to delete the first data object.

14. A terminal device comprising:
   a memory configured to store instructions; and
   a processor coupled to the memory and configured to execute the instructions to cause the terminal device to:
      send, to a cloud device, version information of an application, wherein the version information of the application enables the cloud device to determine a first data record that is of a first data object and that is in the terminal device;
      modify, in response to obtaining a first operation of the application for the first data object, the first data record that comprises a primary key field for storing a primary key for uniquely identifying the first data object, a first field for storing an attribute for describing the first data object, a version number field for storing a first version number of the first data object, and a synchronization status field;
      send, to the cloud device, a synchronization message comprising the primary key;
      receive, from the cloud device, a synchronization response message that comprises the primary key and that is based on a second data record that is in the cloud device, that corresponds to the first data object, and that is based on the synchronization message; and
      perform, in response to the synchronization response message, a modification operation on the first data record.

15. The terminal device of claim 14, wherein the synchronization response message further comprises a third version number, wherein the first operation is an insertion operation comprising attribute information, and wherein the processor is further configured to execute the instructions to cause the terminal device to:
- obtain the insertion operation;
- fill, in response to obtaining the insertion operation, the primary key field with the primary key;
- fill, in response to the insertion operation, the first field with the attribute information;
- change a first value of the version number field to a second version number;
- change a second value of the synchronization status field to a third value to indicate that the first data record is in a to-be-synchronized state;
- change the first value from the second version number to the third version number based on the synchronization response message; and
- change the second value to a fourth value to indicate that the first data record is in a synchronized state.

16. The terminal device of claim 14, wherein the synchronization response message further comprises a third version number, wherein the first operation is an update operation, and wherein the processor is further configured to execute the instructions to cause the terminal device to:
- obtain the update operation;
- update, in response to obtaining the update operation, a first value of the first field;
- change a second value of the version number field to a second version number;
- change a third value of the synchronization status field to a fourth value to indicate that the first data record is in a to-be-synchronized state;
- change the version number field from the second version number to the third version number based on the synchronization response message; and
- change the third value to a fifth value to indicate that the first data record is in a synchronized state.

17. The terminal device of claim 16, wherein the synchronization response message further comprises a sixth value of a second first field in the second data record, and wherein the processor is further configured to execute the instructions to cause the terminal device to update, based on the sixth value, the first value.

18. The terminal device of claim 16, wherein the synchronization response message further comprises a sixth value of a second first field in the second data record, and wherein the processor is further configured to execute the instructions to cause the terminal device to:
- determine, based on the first value and the sixth value, an updated value of the first field;
- modify, using the updated value, the first value;
- send, to the cloud device, the primary key, the updated value, and the third version number to enable the cloud device to modify the sixth value using the updated value;
- receive, from the cloud device, a fourth version number and the primary key; and
- change the second value from the third version number to the fourth version number.

19. The terminal device of claim 14, wherein the first operation is a deletion operation, wherein the first data record further comprises a deletion indication field, and wherein the processor is further configured to execute the instructions to cause the terminal device to:
- obtain the deletion operation;
- change, in response to obtaining the deletion operation, a first value of the deletion indication field to a second value to indicate to delete the first data object; and
- delete the first data record.

20. The terminal device of claim 14, wherein the application comprises an address book application, a gallery application, or an instant application.

* * * * *